(12) United States Patent
Hamano et al.

(10) Patent No.: US 7,457,046 B2
(45) Date of Patent: Nov. 25, 2008

(54) ZOOM LENS SYSTEM AND IMAGE-TAKING APPARATUS

(75) Inventors: Hiroyuki Hamano, Ibaraki (JP); Nobuyuki Miyazawa, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 979 days.

(21) Appl. No.: 10/882,143

(22) Filed: Jun. 30, 2004

(65) Prior Publication Data
US 2005/0007480 A1 Jan. 13, 2005

(30) Foreign Application Priority Data
Jul. 1, 2003 (JP) ............................. 2003-189717
Feb. 26, 2004 (JP) ............................. 2004-052204

(51) Int. Cl.
*G02B 15/14* (2006.01)
*H04N 5/262* (2006.01)

(52) U.S. Cl. ..................... 359/687; 359/684; 348/240.3

(58) Field of Classification Search ............. 348/240.3; 359/684, 685, 686, 687
See application file for complete search history.

(56) References Cited

U.S. PATENT DOCUMENTS

| | | | |
|---|---|---|---|
| 5,189,558 A | 2/1993 | Ishii et al. | |
| 5,267,082 A | 11/1993 | Ono et al. | |
| 5,424,869 A | 6/1995 | Nanjo | |
| 5,585,966 A | 12/1996 | Suzuki | |
| 5,712,733 A * | 1/1998 | Mukaiya | 359/687 |
| 5,719,708 A | 2/1998 | Nagaoka | |
| 5,940,221 A | 8/1999 | Okayama et al. | |
| 6,118,593 A | 9/2000 | Tochigi | |
| 6,166,864 A | 12/2000 | Horiuchi | |
| 6,414,800 B1 | 7/2002 | Hamano | |
| 6,972,909 B2 * | 12/2005 | Hamano et al. | 359/687 |
| 6,982,835 B2 * | 1/2006 | Tomioka | 359/687 |
| 7,420,746 B2 * | 9/2008 | Miyazawa | 359/687 |

FOREIGN PATENT DOCUMENTS

| | | |
|---|---|---|
| JP | 4-43311 | 2/1992 |
| JP | 5-72475 | 3/1993 |
| JP | 6-34882 | 2/1994 |
| JP | 7-128619 | 5/1995 |
| JP | 7-199124 | 8/1995 |
| JP | 8-82743 | 3/1996 |
| JP | 8-160299 | 6/1996 |
| JP | 8-292369 | 11/1996 |
| JP | 11-305124 | 11/1999 |
| JP | 2000-89116 | 3/2000 |
| JP | 2000-121941 | 4/2000 |
| JP | 2001-66500 | 3/2001 |

* cited by examiner

*Primary Examiner*—David N Spector
(74) *Attorney, Agent, or Firm*—Morgan & Finnegan, LLP

(57) ABSTRACT

A zoom lens system is disclosed which comprises in order from an object side to an image side: a first lens unit with a positive optical power (inverse of the focal length), a second lens unit with a negative optical power; and one or more lens units; and with which at least one of the first lens unit and the second lens unit is moved during zooming. By specifying the optical characteristics (shape, material, focal length, etc.) of the lens elements making up the second lens unit in the zoom lens system, a high zoom ratio is obtained with a simple arrangement, and an optical system, which can adequately accommodate even the use of a solid-state image pickup element with a large number of pixels, is realized.

14 Claims, 15 Drawing Sheets

ZOOM LENS SYSTEM AND IMAGE-TAKING APPARATUS

This application claims priority from Japanese Patent Application No. 2003-189717 filed on Jul. 1, 2003 and Japanese Patent Application No. 2004-052204 filed on Feb. 26, 2004, which are hereby incorporated by reference.

BACKGROUND OF THE INVENTION

1. Field of the Invention

The present invention relates to a zoom lens system, in particular, a zoom lens system favorable for an image taking optical system of an image-taking apparatus, such as a video camera or digital still camera, etc.

2. Description of the Related Art

In recent years, video cameras, digital still cameras, and other image-taking apparatuses that use solid-state image pickup elements have become more advanced in functions, and in accompaniment, zoom lenses that are compact and yet high in definition are being demanded as image taking optical systems for such apparatuses.

As a zoom lens that satisfies such needs, there is known a so-called rear focus type zoom lens, which comprises, in the order from the object side, the four lens units of a first lens unit with a positive refractive power, a second lens unit with a negative refractive power, a third lens unit with a positive refractive power, and a fourth lens unit with a positive refractive power, and wherein zooming is performed by moving the second lens unit and focusing and correction of the variation of the image surface that accompanies zooming are performed by using the fourth lens unit (for example, Patent Documents 1 to 6).

Generally in comparison with a zoom lens with which focusing is performed by moving the first lens unit, the effective diameter of the first lens unit is small and the lens system as a whole can be made compact readily in a rear focus type zoom lens. Also, close-distance image taking is enabled, and furthermore, since comparatively compact and lightweight lens units are moved and a small driving force is thus sufficient for driving the lens units, the characteristic that rapid focusing can be performed in the autofocus process is provided. However, when attempts are made to maintain compactness while making the zoom ratio high with such an optical system, it becomes difficult to correct the variation of the chromatic aberration of magnification which occurs during zooming.

Meanwhile, there are known zoom lenses, with which the second lens unit has a negative lens positioned at the most image side thereof and is configured as a whole with three negative lenses and one positive lens for correction of the variation of the chromatic aberration of magnification which occurs during zooming (for example, Patent Documents 6 and 7).

There are also known zoom lenses, with which a high-dispersion glass material with an Abbe's number vd of approximately 21 is used as the material of a positive lens of the second lens unit (for example, Patent Documents 8 and 9).

Also, as a vibration control optical system having a function of repressing the blurring of a taken image, there has been known since priorly a four-unit zoom lens arrangement, comprising first, second, third, and fourth lens units with positive, negative, positive, and positive refractive powers, respectively, wherein the third lens unit is configured from two lens units of positive and negative refractive powers and the lens unit with the positive refractive power in the third lens unit is vibrated to correct the blurring of the image (for example, Patent Document 10). There is also known a four-unit zoom lens arrangement, comprising first, second, third, and fourth lens units with positive, negative, positive, and positive refractive powers, respectively, wherein the entirety of the third lens unit is vibrated to correct the blurring of the image (for example, Patent Document 11).

There is also known a four-unit zoom lens arrangement, comprising first, second, third, and fourth lens units with positive, negative, positive, and positive refractive powers, respectively, wherein the first, second, and fourth lens units and a stop are moved to perform zooming and the entirety of the third lens unit is vibrated to correct the blurring of the image (for example, Patent Document 12).

[Patent Document 1]
Japanese Patent Application Laid-Open No. H6(1994)-34882 (corresponds to U.S. Pat. No. 5,424,869)

[Patent Document 2]
Japanese Patent Application Laid-Open No. H8(1996)-292369 (corresponds to U.S. Pat. No. 5,940,221)

[Patent Document 3]
Japanese Patent Application Laid-Open No. H11(1999)-305124 (corresponds to U.S. Pat. No. 6,166,864)

[Patent Document 4]
Japanese Patent Application Laid-Open No. H4(1992)-43311 (corresponds to U.S. Pat. No. 5,189,558)

[Patent Document 5]
Japanese Patent Application Laid-Open No. H5(1993)-72475 (corresponds to U.S. Pat. No. 5,267,082)

[Patent Document 6]
Japanese Patent Application Laid-Open No. H8(1996)-82743

[Patent Document 7]
Japanese Patent Application Laid-Open No. 2000-89116 (corresponds to U.S. Pat. No. 6,118,593)

[Patent Document 8]
Japanese Patent Application Laid-Open No. H8(1996)-160299 (corresponds to U.S. Pat. No. 5,719,708)

[Patent Document 9]
Japanese Patent Application Laid-Open No. 2000-121941

[Patent Document 10]
Japanese Patent Application Laid-Open No. H7(1995)-128619

[Patent Document 11]
Japanese Patent Application Laid-Open No. H7(1995)-199124 (corresponds to U.S. Pat. No. 5,585,966)

[Patent Document 12]
Japanese Patent Application Laid-Open No. 2001-66500 (corresponds to U.S. Pat. No. 6,414,800)

With the making of image-taking apparatuses compact and the making of image pickup elements high in the number of pixels, lens systems that are high in optical performance and yet are compact as a whole are being desired. Also, the recording of still images of high quality is desired even with video cameras.

With a zoom lens, when a rear focus method, with which focusing by using a lens unit besides a first lens unit, is employed, though the lens system as a whole can be made compact, the aberration variations that occur during focusing become large and it becomes difficult to obtain high optical performance with respect to object distances from an object at infinity to an object at close distance.

With the arrangement of Patent Document 6, though a merit is provided in terms of aberration corrections due to the second lens unit being configured from four lenses, since the number of lenses is four, the total lens length tends to become long correspondingly.

Also, with the arrangement of Patent Document 8, though the number of lenses of the second lens unit is small, the number of lenses is large for the optical system as a whole and the lens system as a whole tends to become large. Also, with the arrangement of Patent Document 9, since the second lens unit is configured as an adhered lens of a positive lens and a negative lens, the degree of freedom of design tends to be low.

Meanwhile, with a vibration control optical system, with which a part of the lenses of an image taking system is decentered in parallel in a direction perpendicular to the optical axis, a still image can be obtained even if hand-shake, etc. occurs. However, in the vibration control process, the amount of decentration aberration that occurs becomes large and the optical performance is lowered.

SUMMARY OF THE INVENTION

An object of the present invention is to provide a zoom lens, having a high zoom ratio and yet a simple arrangement and having high optical performance that can accommodate even the use, for example, of a solid-state image pickup device with a large number of pixels.

A zoom lens system of one aspect of the present invention, comprising, in order from an object side (front side) to an image side (rear side): a first lens unit with a positive optical power (inverse of the focal length); and a second lens unit with a negative optical power; and at least one lens unit; wherein at least one of the first lens unit and the second lens unit is moved during zooming. The above object is achieved by specifying the optical characteristics (shape, material, focal length, etc.) of lens elements making up the second lens unit of the zoom lens system.

DETAILED DESCRIPTION OF THE PREFERRED EMBODIMENTS

Embodiments of a zoom lens according to the present invention and an image-taking apparatus having the zoom lens shall now be described.

Embodiment 1

Zoom lens systems of Embodiment 1 shall first be described.

Figure 1:
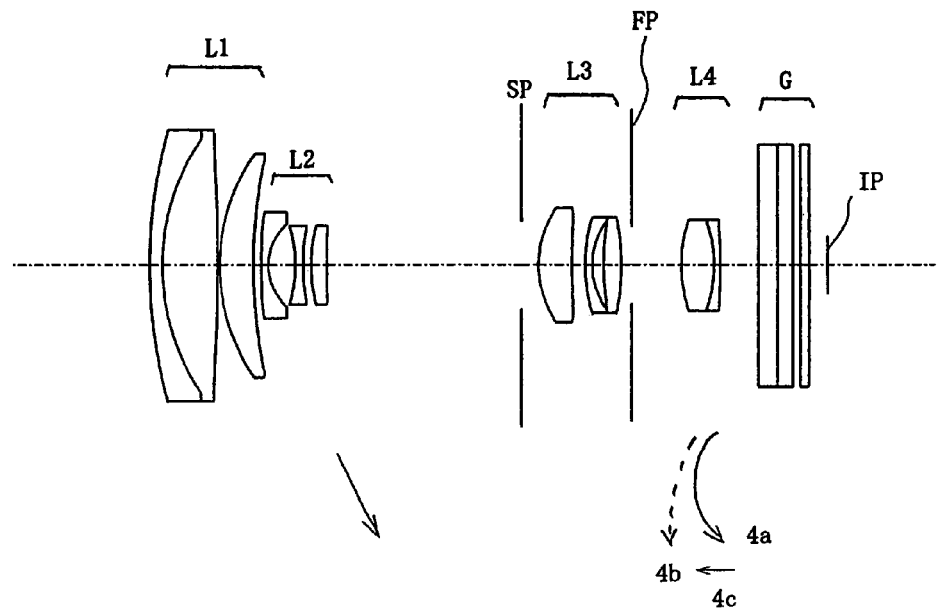
FIG. 1 shows a section of a zoom lens of Numerical Example 1 at a wide angle end.
Figure 2:
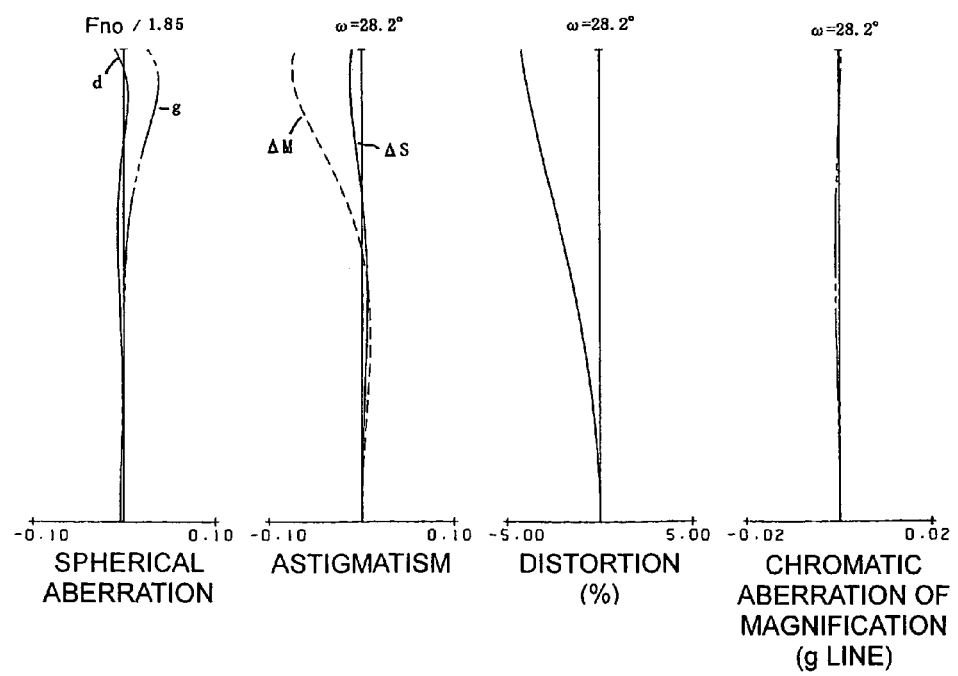
FIG. 2 show various types of aberration of the zoom lens of Numerical Example 1 at the wide angle end.
Figure 3:
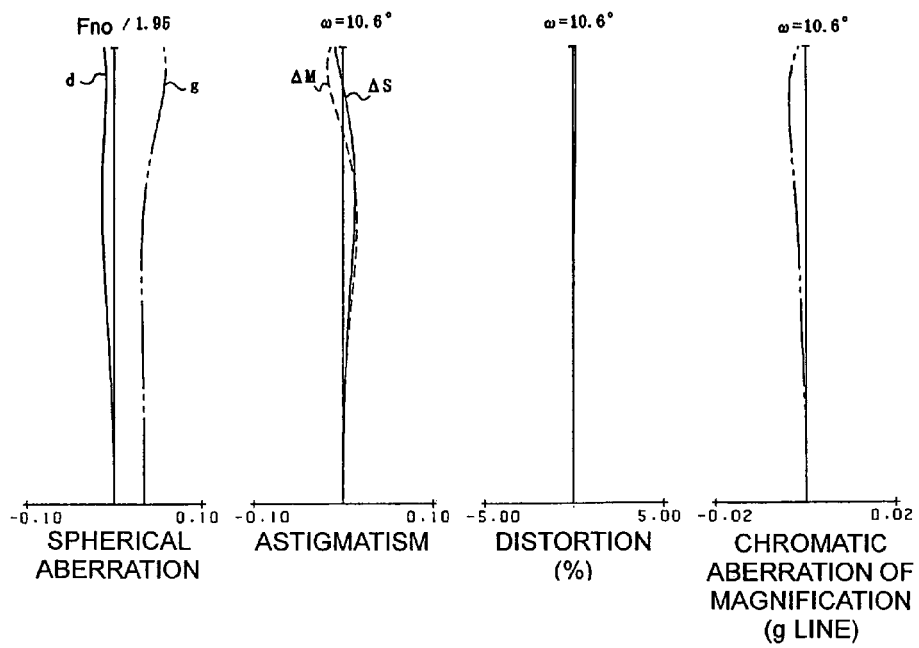
FIG. 3 show various types of aberration of the zoom lens of Numerical Example 1 at an intermediate zoom position.
Figure 4:
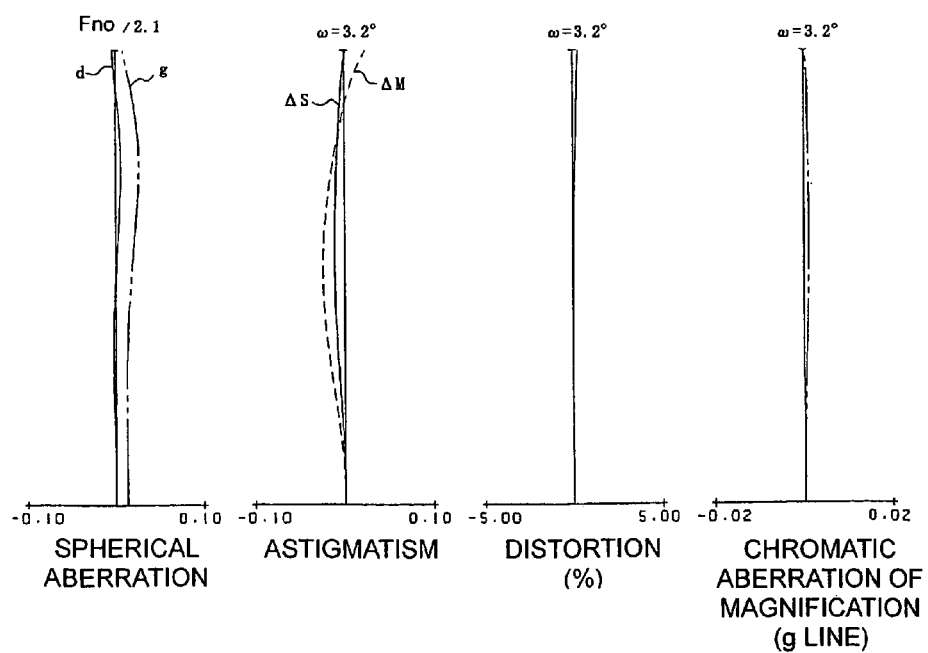
FIG. 4 show various types of aberration of the zoom lens of Numerical Example 1 at a telephoto end.
Figure 5:
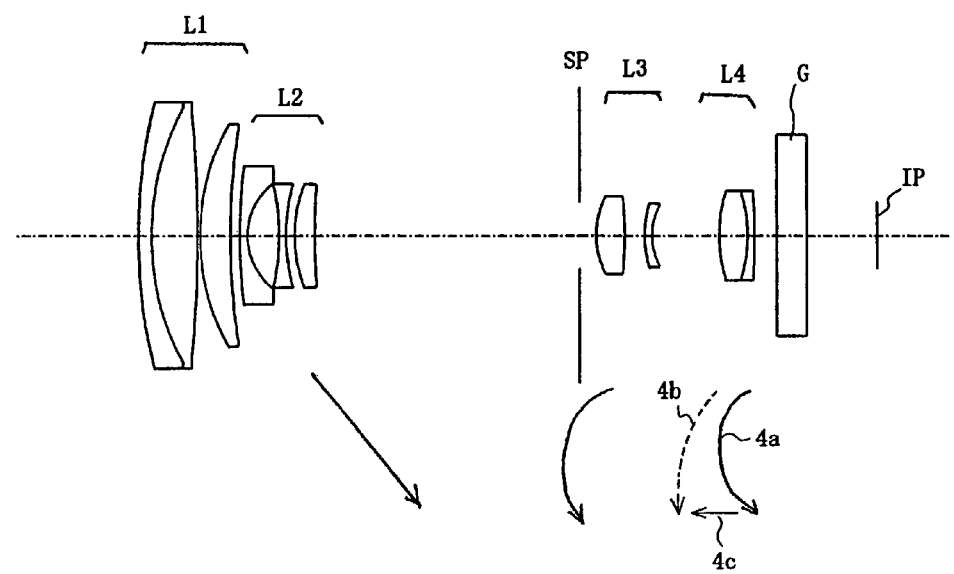
FIG. 5 shows a section of a zoom lens of Numerical Example 2 at a wide angle end.
Figure 6:
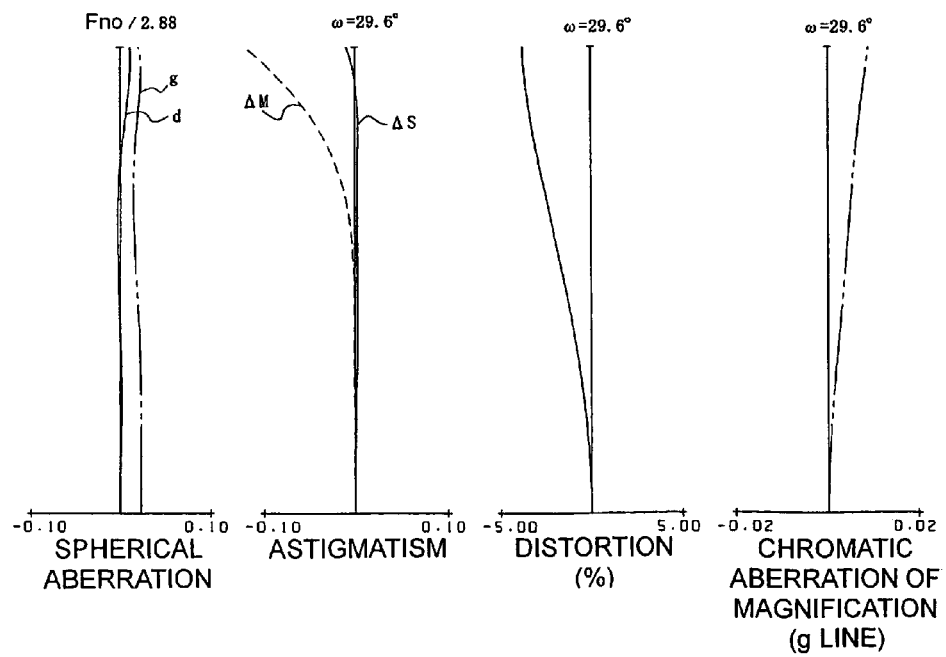
FIG. 6 show various types of aberration of the zoom lens of Numerical Example 2 at the wide angle end.
Figure 7:
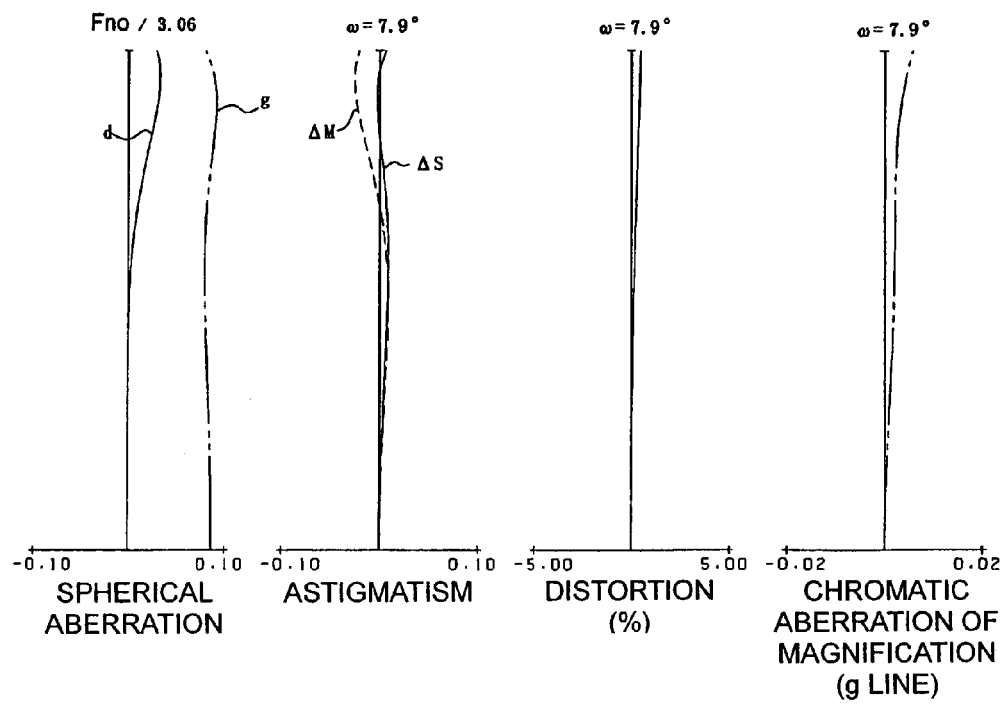
FIG. 7 show various types of aberration of the zoom lens of Numerical Example 2 at an intermediate zoom position.
Figure 8:
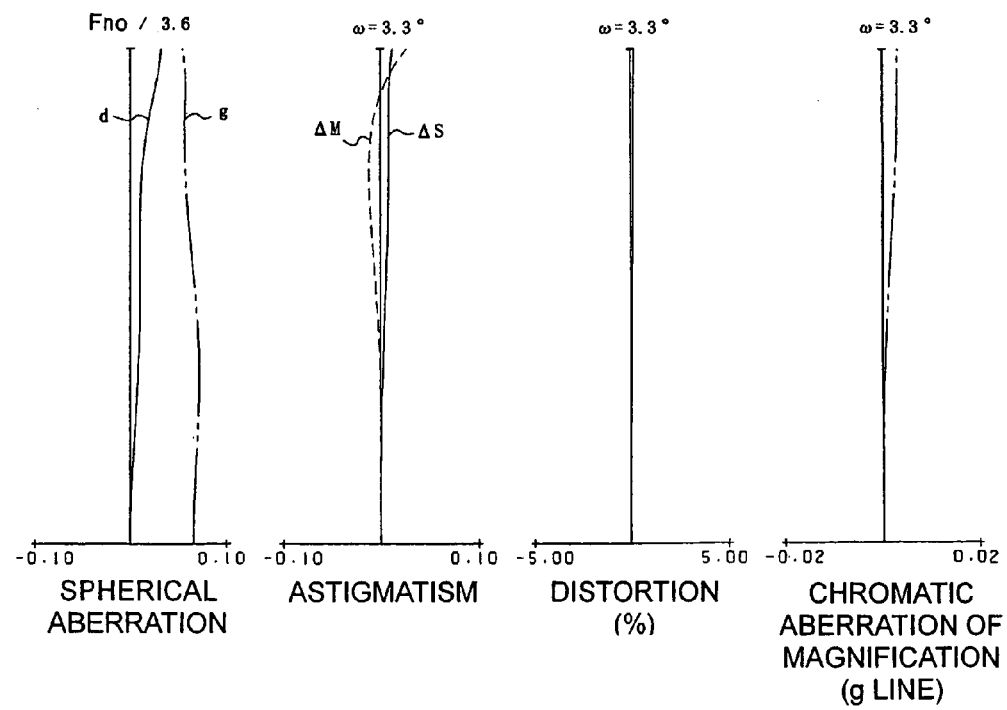
FIG. 8 show various types of aberration of the zoom lens of Numerical Example 2 at a telephoto end.

FIG. 1 shows a section of a zoom lens according to Numerical Example 1 of the present embodiment at a wide angle end, and FIGS. 2, 3, and 4 respectively show various types of aberration in this zoom lens at the wide angle end, an intermediate zoom position, and a telephoto end FIG. 5 shows a section of a zoom lens according to Numerical Example 2 of the present embodiment at a wide angle end, and FIGS. 6, 7, and 8 respectively show various types of aberration in this zoom lens at the wide angle end, an intermediate zoom position, and a telephoto end.

Figure 9:
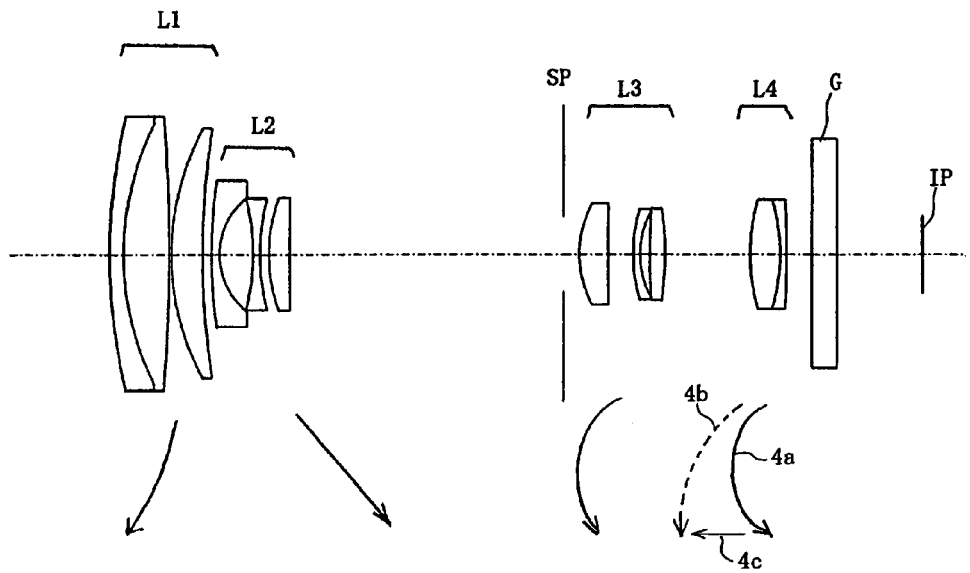
FIG. 9 shows a section of a zoom lens of Numerical Example 3 at a wide angle end.
Figure 10:
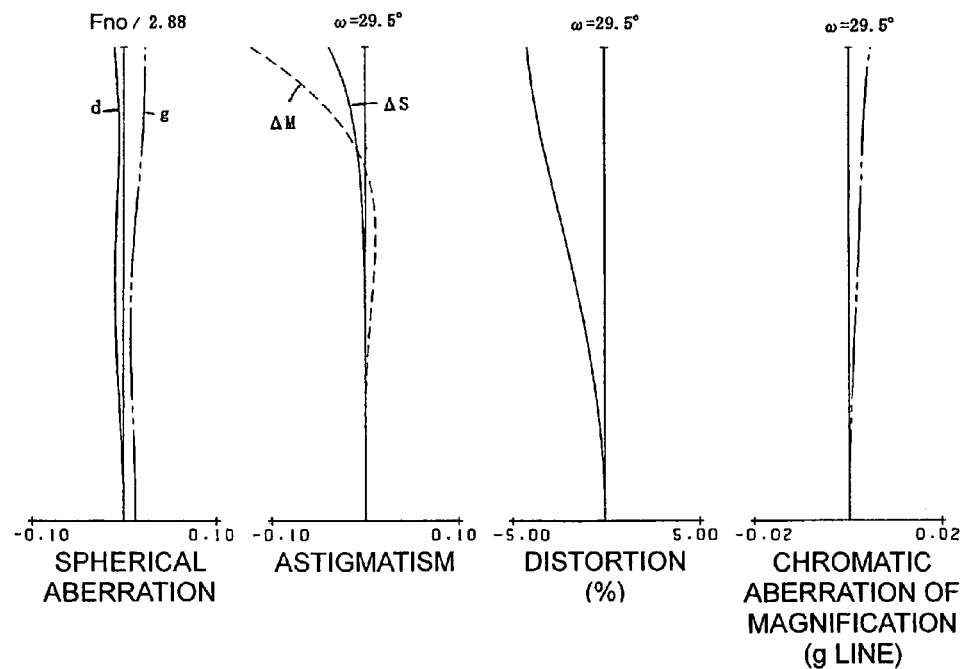
FIG. 10 show various types of aberration of the zoom lens of Numerical Example 3 at the wide angle end.
Figure 11:
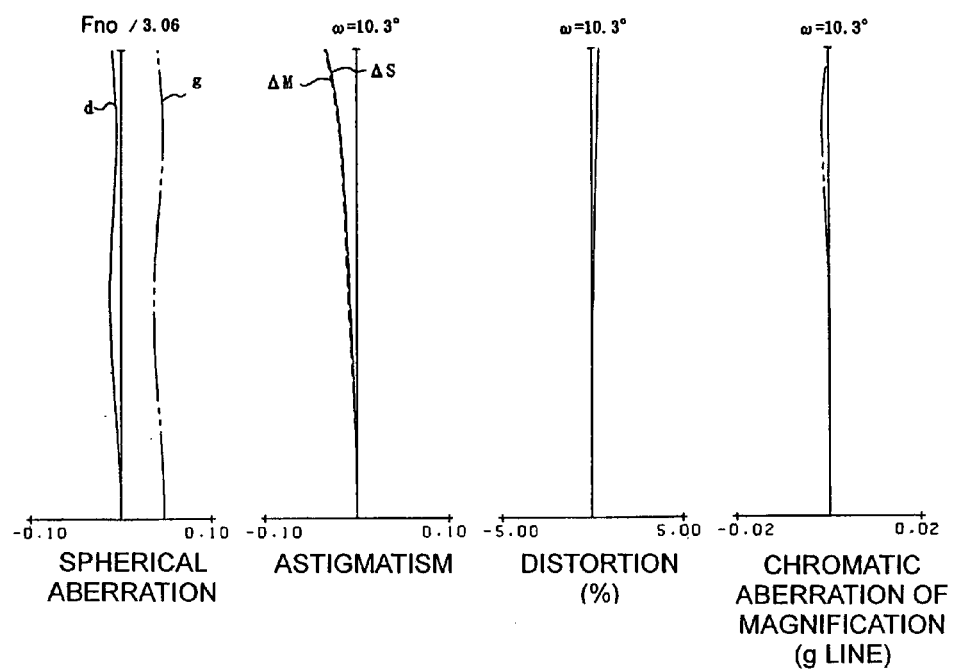
FIG. 11 show various types of aberration of the zoom lens of Numerical Example 3 at an intermediate zoom position.
Figure 12:
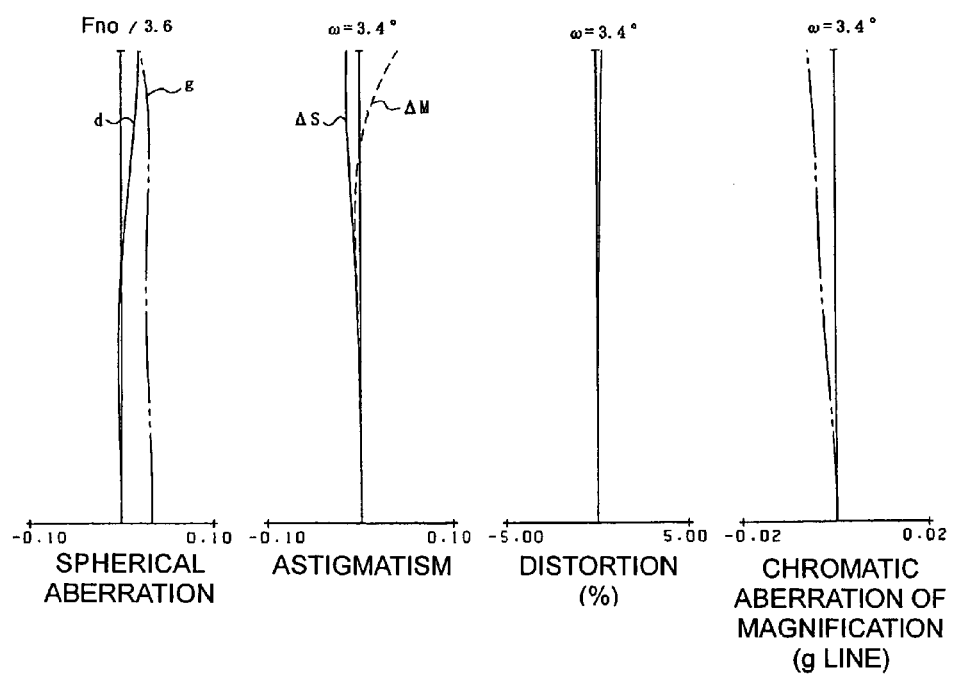
FIG. 12 show various types of aberration of the zoom lens of Numerical Example 3 at a telephoto end.

FIG. 9 shows a section of a zoom lens according to Numerical Example 3 of the present embodiment at a wide angle end, and FIGS. 10, 11, and 12 respectively show various types of aberration in this zoom lens at the wide angle end, an intermediate zoom position, and a telephoto end.

Figure 13:
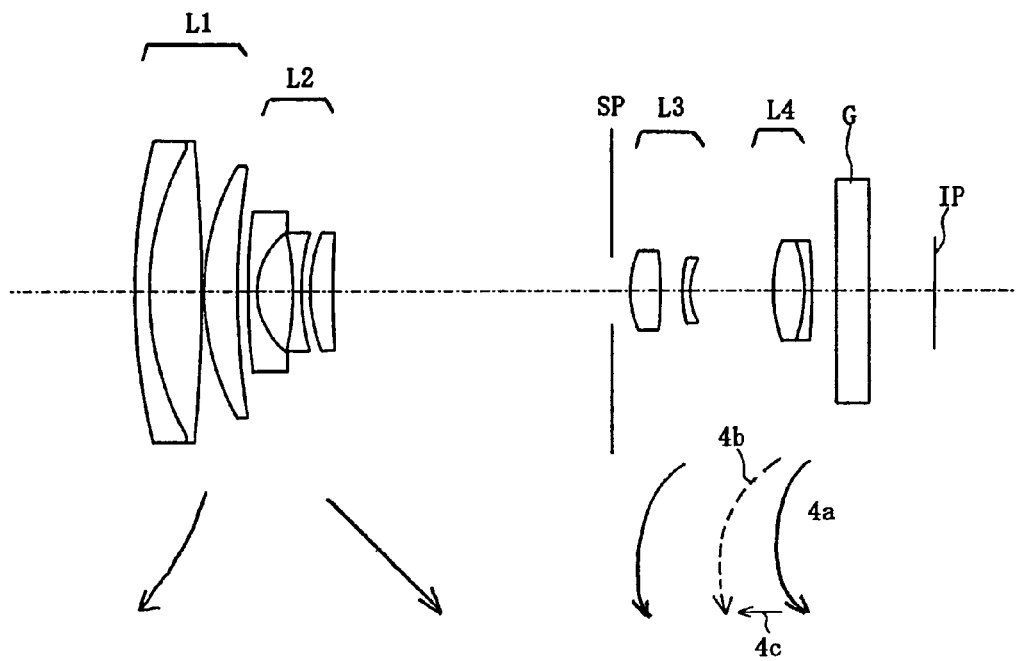
FIG. 13 shows a section of a zoom lens of Numerical Example 4 at a wide angle end.
Figure 14:
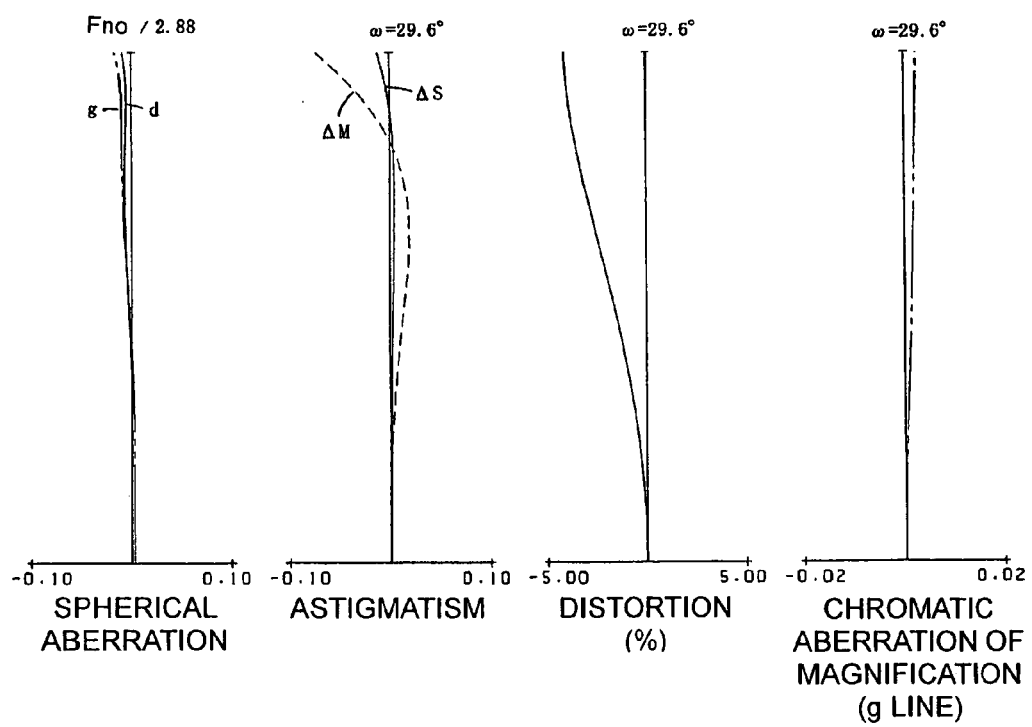
FIG. 14 show various types of aberration of the zoom lens of Numerical Example 4 at the wide angle end.
Figure 15:
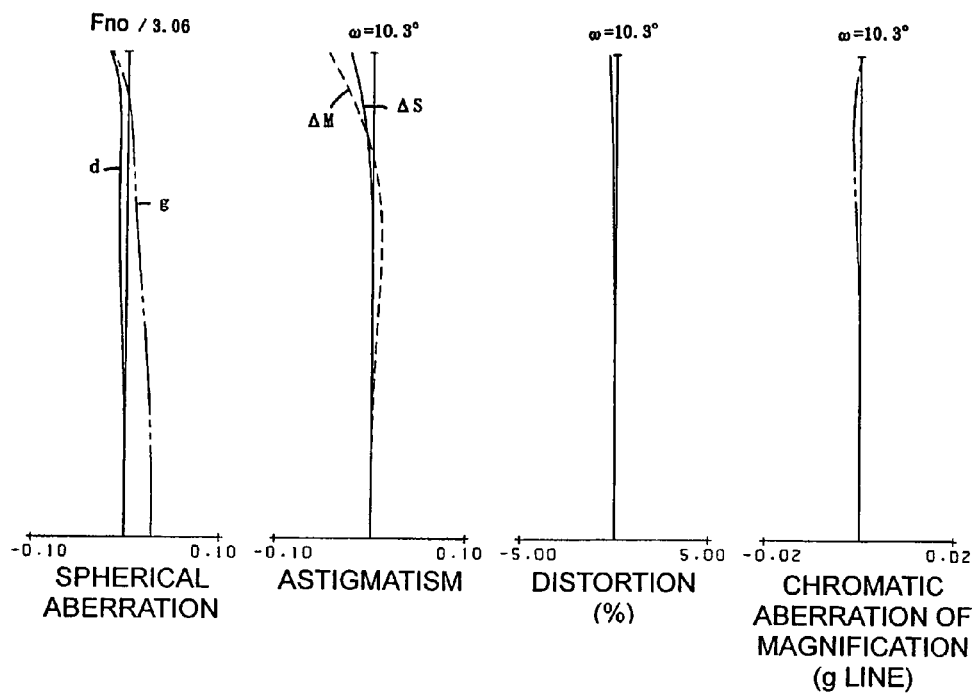
FIG. 15 show various types of aberration of the zoom lens of Numerical Example 4 at an intermediate zoom position.
Figure 16:
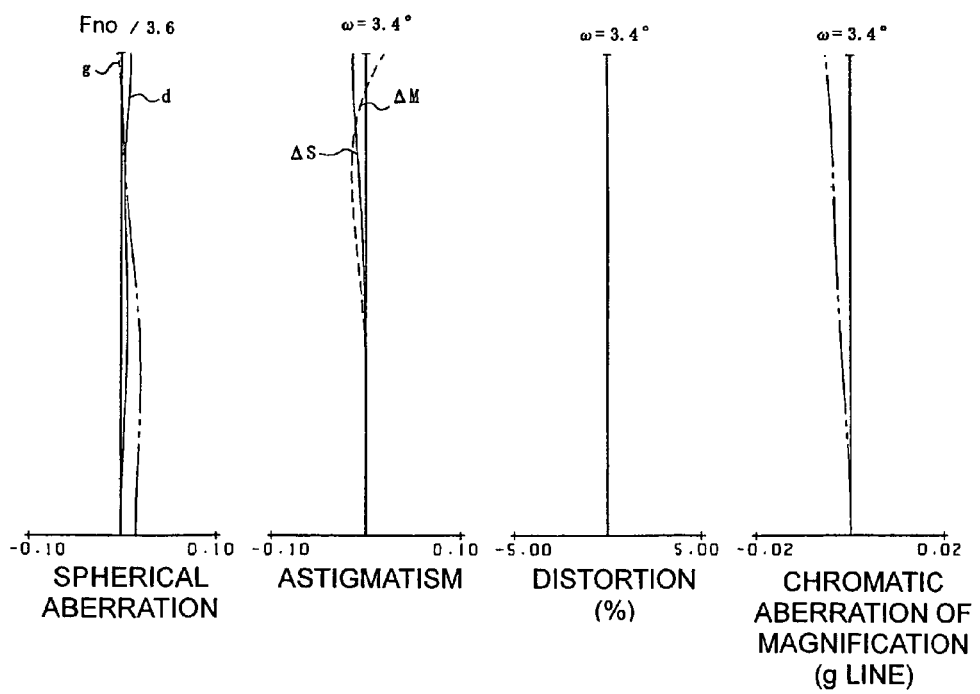
FIG. 16 show various types of aberration of the zoom lens of Numerical Example 4 at a telephoto end.

FIG. 13 shows a section of a zoom lens according to Numerical Example 4 of the present embodiment at a wide angle end, and FIGS. 14, 15, and 16 respectively show various types of aberration in this zoom lens at the wide angle end, an intermediate zoom position, and a telephoto end.

Each zoom lens of the present embodiment is an image taking lens system used in an image-taking apparatus, and in each lens section, the left side is the object side (front side) and the right side is the image side (rear side). In each lens section, L1 is a first lens unit with a positive refractive power (optical power=inverse of the focal length), L2 is a second lens unit with a negative refractive power, L3 is a third lens unit with a positive refractive power, and L4 is a fourth lens unit with a positive refractive power. SP is an aperture stop, which is positioned at the object side of the third lens unit L3. FP is a flare stop, which is positioned at the image side of the third lens unit L3.

G is an optical block corresponding to an optical filter, faceplate, etc. IP is an image surface, corresponding to an image pickup surface of CCD sensor, CMOS sensor, or other solid-state image pickup element (photoelectric conversion element) in a case of use as an image taking optical system of a video camera or a digital still camera or to a film surface in a case of use as an image taking optical system of a camera for silver halide film.

In the aberration diagrams, d and g indicate the d line and g line, respectively, $\Delta M$ and $\Delta S$ indicate the meridional image surface and sagittal image surface, respectively, and the chromatic aberration of magnification is shown for the g line.

With each of the following Examples, the wide angle end and the telephoto end refer to zoom positions at which the lens units for zooming are positioned at the respective ends of the movable range along the optical axis in terms of mechanism.

As shown by the arrows, with the zoom lens of FIG. 1, in the process of zooming from the wide angle end to the telephoto end, the second lens unit L2 is moved towards the image side to perform zooming and the fourth lens unit L4 is moved so as to follow a track that is convex towards the object side to correct the variation of the image surface that occurs during zooming.

Also, a rear focus method, wherein the fourth lens unit L4 is moved along the optical axis to perform focusing, is employed. The solid curve 4a and the dotted curve 4b concerning the fourth lens unit L4 are the movement tracks for correcting the variation of the image surface that accompanies zooming when the focus is set on an object at infinity and an object at close distance, respectively. By thus making the movement track of the fourth lens unit L4 convex towards the object side, effective use is made of the space between the third lens unit L3 and the fourth lens unit L4 and reduction of the total lens length is achieved effectively.

With the zoom lens of FIG. 1, when focusing is to be performed, for example, from an object at infinity to an object at close distance at the telephoto end, the fourth lens unit L4 is moved towards the front as indicated by the arrow 4c. Though the first lens unit L1 and the third lens unit L3 are fixed in the optical axis direction during zooming and focusing are performed, these may be moved if necessary for aberration corrections.

As shown by the arrows, with the zoom lens of FIG. 5, in the process of zooming from the wide angle end to the telephoto end, the second lens unit L2 is moved towards the image side, the third lens unit L3 is moved so as to follow a part of a track that is convex towards the object side, and the fourth lens unit L4 is moved so as to follow a part of a track that is convex towards the object side.

Also, a rear focus method, wherein the fourth lens unit L4 is moved along the optical axis to perform focusing, is employed. The solid curve 4a and the dotted curve 4b concerning the fourth lens unit L4 are the movement track when the focus is set on an object at infinity and an object at close distance, respectively.

With the zoom lens of FIG. 5, when focusing is to be performed, for example, from an object at infinity to an object at close distance at the telephoto end, the fourth lens unit L4 is moved towards the front as indicated by the arrow 4c. Though the first lens unit L1 is fixed in the optical axis direction during zooming and focusing are performed, this may be moved if necessary for aberration corrections.

The aperture stop SP is positioned between the second lens unit L2 and the third lens unit L3. The aperture stop SP is moved integrally with the third lens unit L3 in the zooming process, thereby the mechanical structure is simplified.

In particular with the zoom lens of FIG. 5, by moving the third lens unit L3 towards the object side during zooming from the wide angle end to an intermediate zoom position, the change of focal length is quickened at the wide angle side and reduction of the front lens diameter is achieved. Also, by making the aperture stop SP move towards the object side, the increasing of the front lens diameter for securing the lower rays in the intermediate zoom region can be lowered to enable the front lens diameter to be made even smaller.

Also, since at the zoom position at which the fourth lens unit L4 is moved to the most object side for an object at the closest distance, the third lens unit L3 is also moved so as to be positioned at the object side, the interval between the third lens unit L3 and the fourth lens unit L4 can be secured and the interval between the third lens unit L3 and the fourth lens unit L4 at the wide angle end can be shortened, thereby enabling the total lens length to be shortened.

As shown by the arrows, with the zoom lenses of FIGS. 9 and 13, during zooming from the wide angle end to the telephoto end, the first lens unit L1 is moved towards the object side, the second lens unit L2 is moved towards the image side, the third lens unit L3 is moved so as to follow a part of a track that is convex towards the object side, and the fourth lens unit L4 is moved so as to follow a part of a track that is convex towards the object side. Also, a rear focus method, wherein the fourth lens unit L4 is moved along the optical axis to perform focusing, is employed.

The solid curve 4a and the dotted curve 4b concerning the fourth lens unit L4 are the movement tracks when the focus is set on an object at infinity and an object at close distance, respectively.

With the zoom lenses of FIG. 9, when focusing is to be performed, for example, from an object at infinity to an object at close distance at the telephoto end, the fourth lens unit L4 is moved towards the front as indicated by the arrow 4c. With the zoom lenses of FIG. 13, when focusing is to be performed, for example, from an object at infinity to an object at close distance at the telephoto end, the fourth lens unit L4 is moved towards the front as indicated by the arrow 4c.

The aperture stop SP is positioned between the second lens unit L2 and the third lens unit L3. The aperture stop SP is moved integrally with the third lens unit L3, thereby the mechanical structure is simplified.

With the zoom lenses of FIGS. 9 and 13, by making the first lens unit L1 move during zooming, the total lens length at the wide angle end is shortened and reduction of the front lens diameter is achieved in comparison to the zoom lens of FIG. 5.

Matters in common to the zoom lenses of the present embodiment (Numerical Examples 1 to 4) shall now be described.

With the present embodiment, the second lens unit L2 is configured, in the order from the object side to the image side, from the three lenses of a meniscus-shaped negative lens (first lens element) 21, with a concave surface at the image side (the image side surface of the lens element 21 being greater in the absolute value of refractive power than the object side surface), a negative lens (second lens element) 22, with which both lens surfaces are concave surfaces, and a positive lens (third lens element) 23, with which the object side is a convex surface, and a high-dispersion glass material is used for the positive lens 23.

With a zoom lens of four lens units arrangement, with which compact size, high zoom ratio, and high performance are demanded, the second lens unit L2 is generally configured from the four lenses of three negative lenses and one positive lens or from a larger number of lenses. Meanwhile, with the zoom lens of the present embodiment, by using a glass material of high dispersion as the positive lens 23 of the second lens unit L2, the second lens unit L2 is made to have a three-lens arrangement as a whole, the chromatic aberrations that occur are reduced, and the variations of astigmatism and distortion during zooming are also corrected to realize good optical performance.

With the present embodiment, a part or the entirety of the third lens unit L3 is moved (displaced) so as to have a component in a direction perpendicular to the optical axis to correct image blur when the entirety of the optical system is shaken. A vibration control is thus carried out without adding a variable apex angle prism or other optical member or a lens unit for the vibration control, and the making of the optical system large as whole is thus repressed. Also, in order to reduce the variation of light amount during correcting for the blurring of a taken image, the stop aperture diameter is made small at the telephoto side during zooming to restrict the central light flux and thereby increase the peripheral light amount in a relative manner.

Also, by introducing an aspherical surface in the third lens unit L3, the total lens length is shortened while enabling good correction of spherical aberration at the wide angle end, thereby providing high optical performance.

Also, by making the number of lenses, besides a low-pass filter and an infrared cut filter (that is, besides optical members without refractive power), no more than eleven for the optical system as a whole, compact size and high performance are achieved.

The characteristics of the lens arrangement of the present embodiment shall now be described.

When ν23 represents the Abbe's number of material of the positive lens 23 and N21 and N22 represent the refractive indices of the materials forming the negative lens 21 and the negative lens 22, respectively, the zoom lenses of the present embodiment (Numerical Examples 1 to 4) satisfy the following conditions:

$$\nu23 < 20.0 \tag{1}$$

$$1.65 < (N21 + N22)/2 \tag{2}$$

The conditional expression (1) is for performing chromatic aberration correction effectively with a single positive lens. When the Abbe's number becomes so large that the upper limit of the conditional expression (1) is exceeded, the achromatic effect of the second lens unit L2 becomes weak and it becomes difficult to achieve both a high zoom ratio and high performance at the same time with a small number of lenses. Also, the refractive index generally increases when high dispersion material is used as the material of the positive lens 23. Furthermore, the Petzval's sum increases in the positive direction and the sagittal image surface becomes excessive. In order to decrease the degradation of the optical performance due to this effect, it is effective to make the refractive indices (index) of the materials of the negative lenses 21 and 22 high so as to satisfy the conditional expression (2). It is not preferable to make the refractive indices of the materials of the negative lenses 21 and 22 become so low that the lower limit of conditional expression (2) is not attained, since the Petzval's sum will then increase in the negative direction and the correction of the sagittal curvature of field becomes difficult.

More preferably, the conditional expression (1) is set as follows:

$$\nu23 < 19 \tag{1a}$$

Also, the conditional expression (2) is preferably set as follows:

$$1.72 < (N21 + N22)/2 \tag{2a}$$

By setting the refractive indices of the materials of the negative lenses 21 and 22 within the range of the conditional expression (2a), the correction of curvature of field is facilitated further.

When f2 and f23 represent the respective focal lengths of the second lens unit L2 and the positive lens 23 in the second lens unit L2, the zoom lenses of the present embodiment (Numerical Examples 1 to 4) satisfy the following condition:

$$1.8 < |f23/f2| < 3.7 \tag{3}$$

The conditional expression (3) is mainly for correcting the variation of chromatic aberration during zooming while also performing good correction of the variations of curvature of field, astigmatism, and other aberrations.

It is not preferable to make the refractive power of the material of the positive lens 23 become so strong that the lower limit of the conditional expression (3) is not attained since the astigmatism at the wide angle end will then increase in the negative direction (undercorrection). Oppositely, it is not preferable to make the refractive power of the positive lens 23 become so weak that the upper limit of the conditional expression (3) is exceeded since the variations of chromatic aberrations, in particular, the variation of the chromatic aberration of magnification will then be difficult to correct.

More preferably, the numerical range of the conditional expression (3) is preferably set as follows:

$$2.0 < |f23/f2| < 3.0 \tag{3a}$$

When R23a and R23b represent the radii of curvature of the object side and image side surfaces, respectively, of the positive lens 23 in the second lens unit L2, the zoom lenses of the present embodiment (Numerical Examples 1 to 4) satisfy the following condition:

$$0.8 < (R23b + R23a)/(R23b - R23a) < 2.0 \tag{4}$$

The conditional expression (4) is for appropriately setting the shape of the positive lens 23 so as to perform good correction of the various aberrations across the entire zoom range.

It is not preferable for the lower limit of the conditional expression (4) not to be attained since the astigmatism at the wide angle end will then increase in the negative direction. Oppositely, it is not preferable for the upper limit to be exceeded since the astigmatism at the wide angle end will then increase in the positive direction (overcorrection).

More preferably, the conditional expression (4) is set to the following range to enable even better optical performance to be achieved:

$$1.0 < (R23b + R23a)/(R23b - R23a) < 1.7 \tag{4a}$$

When fw and ft represent the focal lengths of the entire lens system at the wide angle end and the telephoto end, respectively, the focal length f2 of the second lens unit L2 of each zoom lens of the present embodiment (Numerical Examples 1 to 4) satisfies the following condition:

$$0.25 < |f2|/\sqrt{(fw \times ft)} < 0.6 \tag{5}$$

The conditional expression (5) concerns the refractive power (inverse of the focal length) of the second lens unit L2 and is mainly for achieving reduction of the total optical length while maintaining the optical performance.

It is not preferable to make the refractive power of the second lens unit L2 become so strong that the lower limit of the conditional expression (5) is not attained since, though the movement amount of the second lens unit L2 during zooming will then be reduced, the Petzval's sum will become large as a whole in the negative direction and the curvature of field will become difficult to correct. Oppositely, it is not preferable for the upper limit of the conditional expression (5) to be exceeded since the movement amount of the second lens unit L2 during zooming will then be large and the lens system as a whole cannot be made compact.

More preferably, the conditional expression (5) is set as follows:

$$0.35 < |f2|/\sqrt{(fw \times ft)} < 0.5 \quad (5a)$$

When R22a and R22b represent the radii of curvature of the object side and image side surfaces, respectively, of the negative lens 22 in the second lens unit L2, the zoom lenses of the present embodiment (Numerical Examples 1 to 4) satisfy the following condition:

$$-0.4 < (R22b+R22a)/(R22b-R22a) < 0.4 \quad (6)$$

The conditional expression (6) concerns the shape of the negative lens 22 and is mainly for correcting the astigmatism well. It is not preferable for the lower limit of the conditional expression (6) not to be attained since the astigmatism at the wide angle end will then increase in the positive direction. Oppositely, it is not preferable for the upper limit to be exceeded since the astigmatism at the wide angle end will then increase in the negative direction.

More preferably, the conditional expression (6) is set as follows:

$$-0.15 < (R22b+R22a)/(R22b-R22a) < 0.3 \quad (6a)$$

When M2 represents the movement amount of the second lens unit L2 that is required for zooming from the wide angle end to the telephoto end and M3 represents the movement amount of the third lens unit L3 to the most object side position during zooming from the wide angle end to the telephoto end (with the sign of the movement amount being positive for movement towards the image side and negative for movement towards the object side), the zoom lenses of Numerical Examples 2 to 4 satisfy the following condition:

$$0.1 < |M3/M2| < 0.3 \quad (7)$$

The conditional expression (7) is a condition that is favorable for cases (Numerical Examples 2 to 4) where the third lens unit L3 is moved during zooming. When the movement amount of the third lens unit L3 becomes so small that the lower limit of the conditional expression (7) is not attained, the front lens diameter cannot be made adequately small. Oppositely, it is not preferable for the movement amount of the third lens unit L3 to become too large with respect to the movement amount of the second lens unit L2 since the total movement amount of the lenses necessary for zooming will then be large and this will be disadvantageous for the reduction of the total lens length.

More preferably, the conditional expression (7) is set as follows:

$$0.12 < |M3/M2| < 0.2 \quad (7a)$$

When M1 and M2 represent the movement amounts of the first lens unit L1 and the second lens unit L2, respectively, that are required for zooming from the wide angle end to the telephoto end (with the sign of the movement amount being positive for movement towards the image side and negative for movement towards the object side), the zoom lenses of Numerical Examples 3 and 4 satisfy the following condition:

$$0.03 < |M1/M2| < 0.4 \quad (8)$$

The conditional expression (8) is a condition that is favorable for cases (Numerical Examples 3 and 4) where the first lens unit L1 is moved during zooming. When the movement amount of the first lens unit L1 becomes so small that the lower limit of the conditional expression (8) is not attained, the total lens length at the wide angle end will not be reduced and the diameters of the lenses positioned further to the object side with respect to the second lens unit L2 cannot be made adequately small. Oppositely, it is not preferable to make the movement amount of the first lens unit L1 become so large that the upper limit of the conditional expression (8) is exceeded since the cam angle of a cam ring for moving the respective lens units will then become steep, causing the load of the actuator for moving the lens units to increase, or the front lens diameter must be made large in order to secure an adequate peripheral light amount at the telephoto end.

More preferably, the conditional expression (8) is set as follows:

$$0.04 < |M1/M2| < 0.2 \quad (8a)$$

The numerical data of Numerical Examples 1 to 4 are shown below. In each Numerical example, i represents the order of the surface from the object side, Ri represents the radius of curvature of each surface, Di represents the member thickness or interval between the i-th surface and the (i+1)-th surface, and Ni and νi respectively represent the refractive index and Abbe's number for the d line. Also, the five surfaces at the most image side of Numerical Example 1 and the two surfaces at the most image side of each of Numerical Examples 2, 3, and 4 are flat surfaces corresponding to a quartz low-pass filter, infrared cut filter, etc. Each aspherical surface is expressed as follows:

$$x = \frac{(1/R)h^2}{1+\sqrt{\{1-(1+k)(h/R)^2\}}} + Bh^4 + Ch^6 + Dh^8 +$$
$$Eh^{10} + Fh^{12} + A'h^3 + B'h^5 + C'h^7 + D'h^9 + E'h^{11}$$

Here, X represents the displacement in the optical axis direction, with respect to the surface apex as a reference, at a position of height h, from the optical axis. In the above, R represents the paraxial radius of curvature, k represents a conical constant, and A', B, B', C, C', D, D', E, E', and F represent aspherical coefficients.

Also, [e–X] means [×10$^{-x}$]. f represents the focal length, Fno represents the F number, and ω represents the half field angle. Also, the relationships between the respective conditional expressions described above and the various numerical values of the Numerical Examples are shown in Table 1.

NUMERICAL EXAMPLE 1 f = 4.19 to 40.13  Fno = 1.85 to 2.12  2ω = 56.5° to 6.4°

| | | | |
|---|---|---|---|
| R1 = 43.791 | D1 = 1.05 | N1 = 1.846660 | ν1 = 23.9 |
| R2 = 19.662 | D2 = 4.60 | N2 = 1.603112 | ν2 = 60.6 |
| R3 = –182.517 | D3 = 0.17 | | |

-continued

| | | | |
|---|---|---|---|
| R4 = 17.008 | D4 = 2.80 | N3 = 1.772499 | ν3 = 49.6 |
| R5 = 46.872 | D5 = Variable | | |
| R6 = 39.186 | D6 = 0.60 | N4 = 1.834807 | ν4 = 42.7 |
| R7 = 4.824 | D7 = 2.22 | | |
| R8 = −12.278 | D8 = 0.60 | N5 = 1.772499 | ν5 = 49.6 |
| R9 = 16.886 | D9 = 0.70 | | |
| R10 = 12.868 | D10 = 1.30 | N6 = 1.922860 | ν6 = 18.9 |
| R11 = 191.791 | D11 = Variable | | |
| R12 = Stop | D12 = 1.38 | | |
| R13 = 7.622 | D13 = 2.80 | N7 = 1.740130 | ν7 = 49.2 |
| (Aspherical Surface) | | | |
| R14 = 57.695 | D14 = 1.07 | | |
| (Aspherical Surface) | | | |
| R15 = 13.932 | D15 = 0.60 | N8 = 1.846660 | ν8 = 23.9 |
| R16 = 6.430 | D16 = 0.95 | | |
| R17 = 25.089 | D17 = 1.50 | N9 = 1.487490 | ν9 = 70.2 |
| R18 = −19.580 | D18 = 0.80 | | |
| R19 = Flare Stop | D19 = Variable | | |
| R20 = 11.552 | D20 = 2.70 | N10 = 1.696797 | ν10 = 55.5 |
| R21 = −11.552 | D21 = 0.50 | N11 = 1.846660 | ν11 = 23.9 |
| R22 = −66.798 | D22 = Variable | | |
| R23 = ∞ | D23 = 1.60 | N12 = 1.520000 | ν12 = 58.6 |
| R24 = ∞ | D24 = 1.27 | N13 = 1.548800 | ν13 = 60.0 |
| R25 = ∞ | D25 = 0.60 | | |
| R26 = ∞ | D26 = 0.75 | N14 = 1.500000 | ν14 = 58.6 |
| R27 = ∞ | | | |

| Variable | Focal Length | | |
|---|---|---|---|
| Distance | 4.19 | 19.19 | 40.13 |
| D5 | 0.60 | 11.73 | 14.87 |
| D11 | 16.15 | 5.02 | 1.88 |
| D19 | 4.04 | 1.27 | 4.44 |
| D22 | 3.10 | 5.87 | 2.70 |

Aspheric Coefficient

R13 k = −9.65918e−1
B = 4.78715e−5  C = −7.54522e−7  D = −1.23873e−6
E = 1.12399e−8
A' = −8.00565e−5  B' = −2.31809e−5  C' = 4.47155e−6
D' = −5.52946e−9

R14 k = 1.13193e+2
B = −1.80066e−4  C = −7.97548e−6  D = −1.75242e−7
A' = −1.17420e−4
B' = 3.10816e−5  C' = −9.00e−7

NUMERICAL EXAMPLE 2 f = 4.85 to 46.99  Fno = 2.88 to 3.6  2ω = 59.1° to 6.7°

| | | | |
|---|---|---|---|
| R1 = 49.088 | D1 = 1.10 | N1 = 1.846660 | ν1 = 23.9 |
| R2 = 23.678 | D2 = 4.00 | N2 = 1.487490 | ν2 = 70.2 |
| R3 = −119.812 | D3 = 0.20 | | |
| R4 = 20.459 | D4 = 2.55 | N3 = 1.772499 | ν3 = 49.6 |
| R5 = 63.284 | D5 = Variable | | |
| R6 = 51.006 | D6 = 0.65 | N4 = 1.834807 | ν4 = 42.7 |
| R7 = 5.995 | D7 = 2.63 | | |
| R8 = −21.041 | D8 = 0.60 | N5 = 1.772499 | ν5 = 49.6 |
| R9 = 17.488 | D9 = 0.70 | | |
| R10 = 13.063 | D10 = 1.70 | N6 = 1.922860 | ν6 = 18.9 |
| R11 = 69.944 | D11 = Variable | | |
| R12 = Stop | D12 = 1.40 | | |
| R13 = 7.344 | D13 = 2.40 | N7 = 1.583126 | ν7 = 59.4 |
| (Aspherical Surface) | | | |
| R14 = −32.507 | D14 = 1.70 | | |
| (Aspherical Surface) | | | |
| R15 = 10.001 | D15 = 0.60 | N8 = 1.846660 | ν8 = 23.9 |
| R16 = 5.560 | D16 = Variable | | |
| R17 = 13.024 | D17 = 2.40 | N9 = 1.696797 | ν9 = 55.5 |
| R18 = −13.024 | D18 = 0.60 | N10 = 1.846660 | ν10 = 23.9 |
| R19 = −51.809 | D19 = Variable | | |
| R20 = ∞ | D20 = 2.45 | N11 = 1.516330 | ν11 = 64.1 |
| R21 = ∞ | | | |

| Variable | Focal Length | | |
|---|---|---|---|
| Distance | 4.85 | 25.57 | 46.99 |
| D5 | 0.80 | 14.80 | 18.75 |
| D11 | 22.39 | 5.47 | 1.97 |
| D19 | 5.70 | 4.46 | 7.63 |
| D22 | 1.80 | 5.96 | 2.35 |
| D21 | 1.80 | 1.80 | 1.80 |

Aspheric Coefficient

R13 k = −2.38804e−1
B = −2.05837e−4  C = 1.94452e−5  D = 5.72948e−7
E = −4.60936e−8
A' = −1.11616e−4
B' = −6.28188e−5  C' = −5.21968e−6

R14

B = −1.76475e−04
C = 9.19251e−06  D = −1.35464e−06
A' = 6.1177e−5  B' = 1.4356e−5

NUMERICAL EXAMPLE 3 f = 5.88 to 56.58  Fno = 2.88 to 3.06  2ω = 58.9° to 6.7°

| | | | |
|---|---|---|---|
| R1 = 54.593 | D1 = 1.20 | N1 = 1.846660 | ν1 = 23.9 |
| R2 = 27.444 | D2 = 3.90 | N2 = 1.487490 | ν2 = 70.2 |
| R3 = −173.066 | D3 = 0.20 | | |
| R4 = 24.110 | D4 = 2.75 | N3 = 1.772499 | ν3 = 49.6 |
| R5 = 72.903 | D5 = Variable | | |
| R6 = 46.331 | D6 = 0.70 | N4 = 1.834000 | ν4 = 37.2 |
| R7 = 6.636 | D7 = 2.97 | | |
| R8 = −20.914 | D8 = 0.60 | N5 = 1.772499 | ν5 = 49.6 |
| R9 = 20.914 | D9 = 0.75 | | |
| R10 = 15.225 | D10 = 1.80 | N6 = 1.922860 | ν6 = 18.9 |
| R11 = 219.179 | D11 = Variable | | |
| R12 = Stop | D12 = 1.40 | | |
| R13 = 9.207 | D13 = 2.60 | N7 = 1.583126 | ν7 = 59.4 |
| (Aspherical Surface) | | | |
| R14 = 377.119 | D14 = 2.16 | | |
| R15 = 15.102 | D15 = 0.60 | N8 = 1.846660 | ν8 = 23.9 |
| R16 = 8.428 | D16 = 0.82 | | |
| R17 = 70.013 | D17 = 1.40 | N9 = 1.487490 | ν9 = 70.2 |
| R18 = −28.241 | D18 = Variable | | |
| R19 = 17.497 | D19 = 2.60 | N10 = 1.696797 | ν10 = 55.5 |
| R20 = −17.497 | D20 = 0.60 | N11 = 1.846660 | ν11 = 23.9 |
| R21 = −71.396 | D21 = Variable | | |
| R22 = ∞ | D22 = 2.20 | N12 = 1.516330 | ν12 = 64.1 |
| R23 = ∞ | | | |

| Variable | Focal Length | | |
|---|---|---|---|
| Distance | 5.88 | 28.53 | 56.58 |
| D5 | 0.80 | 17.48 | 22.72 |
| D11 | 24.31 | 5.57 | 1.82 |
| D18 | 7.27 | 6.07 | 10.78 |
| D21 | 2.20 | 6.94 | 1.69 |

-continued

Aspheric Coefficient

R13 k = −9.72580e−2     B = −3.77301e−5     C = 1.04354e−5     D = 3.60915e−8
E = −3.20604e−10
A' = −4.17382e−5    B' = −4.59486e−5    C' = −1.11569e−6

NUMERICAL EXAMPLE 4 f = 4.85 to 46.67    Fno = 2.88 to 3.06    2ω = 59.1° to 6.7°

| | | | |
|---|---|---|---|
| R1 = 49.112 | D1 = 1.10 | N1 = 1.846660 | ν1 = 23.9 |
| R2 = 23.790 | D2 = 4.00 | N2 = 1.487490 | ν2 = 70.2 |
| R3 = −121.806 | D3 = 0.20 | | |
| R4 = 20.422 | D4 = 2.55 | N3 = 1.772499 | ν3 = 49.6 |
| R5 = 63.166 | D5 = Variable | | |
| R6 = 51.858 | D6 = 0.65 | N4 = 1.806098 | ν4 = 40.9 |
| R7 = 6.051 | D7 = 2.84 | | |
| R8 = −20.697 | D8 = 0.60 | N5 = 1.719995 | ν5 = 50.2 |
| R9 = 16.614 | D9 = 0.70 | | |
| R10 = 12.868 | D10 = 1.70 | N6 = 1.922860 | ν6 = 18.9 |
| R11 = 62.062 | D11 = Variable | | |
| R12 = Stop | D12 = 1.40 | | |
| R13 = 7.256 (Aspherical Surface) | D13 = 2.40 | N7 = 1.583126 | ν7 = 59.4 |
| R14 = −34.292 (Aspherical Surface) | D14 = 1.70 | | |
| R15 = 9.848 | D15 = 0.60 | N8 = 1.846660 | ν8 = 23.9 |
| R16 = 5.481 | D16 = Variable | | |
| R17 = 11.924 | D17 = 2.40 | N9 = 1.696797 | ν9 = 55.5 |
| R18 = −11.924 | D18 = 0.60 | N10 = 1.846660 | ν10 = 23.9 |
| R19 = −37.758 | D19 = Variable | | |
| R20 = ∞ | D20 = 2.45 | N11 = 1.516330 | ν11 = 64.1 |
| R21 = ∞ | | | |

| Variable | Focal Length | | |
|---|---|---|---|
| Distance | 4.85 | 23.37 | 46.67 |
| D5 | 0.80 | 14.63 | 18.74 |
| D11 | 21.45 | 5.24 | 1.95 |
| D16 | 6.37 | 6.56 | 10.09 |
| D19 | 1.80 | 4.54 | 0.56 |

Aspheric Coefficient

R13 k = −2.40189e−1     B = −2.00253e−4     C = 2.04864e−5     D = 8.81883e−7
E = −5.23479e−8
A' = −1.16691e−4    B' = −5.76147e−5    C' = −6.44124e−6

R14 k = 0.0             B = −1.58326e−4     C = 7.39999e−6     D = −1.37750e−6
A' = 4.24803e−5     B' = 2.31898e−5

TABLE 1

| | Numerical Example | | | |
|---|---|---|---|---|
| Conditional Expression | 1 | 2 | 3 | 4 |
| (1) ν23 | 18.9 | 18.9 | 18.9 | 18.9 |
| (2) (N21 + N22)/2 | 1.804 | 1.804 | 1.803 | 1.763 |
| (3) \|f23/f2\| | 2.843 | 2.476 | 2.126 | 2.370 |

TABLE 1-continued

| | Numerical Example | | | |
|---|---|---|---|---|
| Conditional Expression | 1 | 2 | 3 | 4 |
| (4) (R23b + R23a)/(R23b − R23a) | 1.144 | 1.459 | 1.149 | 1.523 |
| (5) \|f2\|/√(fw × ft) | 0.404 | 0.459 | 0.455 | 0.485 |
| (6) (R22b + R22a)/(R22b − R22a) | 0.158 | −0.092 | 0.000 | −0.109 |
| (7) \|M3/M2\| | — | 0.138 | 0.154 | 0.146 |
| (8) \|M1/M2\| | — | — | 0.125 | 0.054 |

Embodiment 2

A zoom lens system of Embodiment 2 shall now be described.

Figure 17:
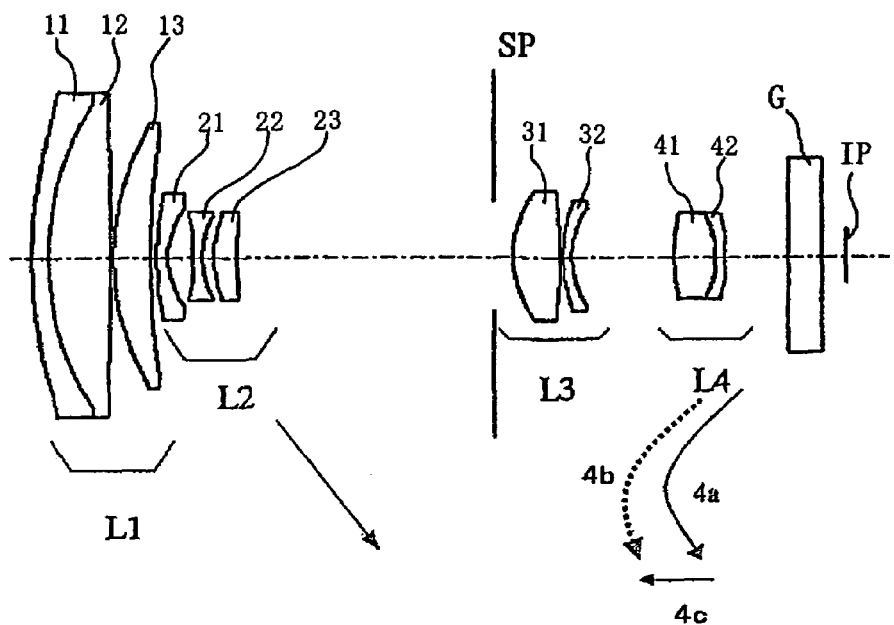
FIG. 17 shows a section of a zoom lens of Numerical Example 5 at a wide angle end.
Figure 18:
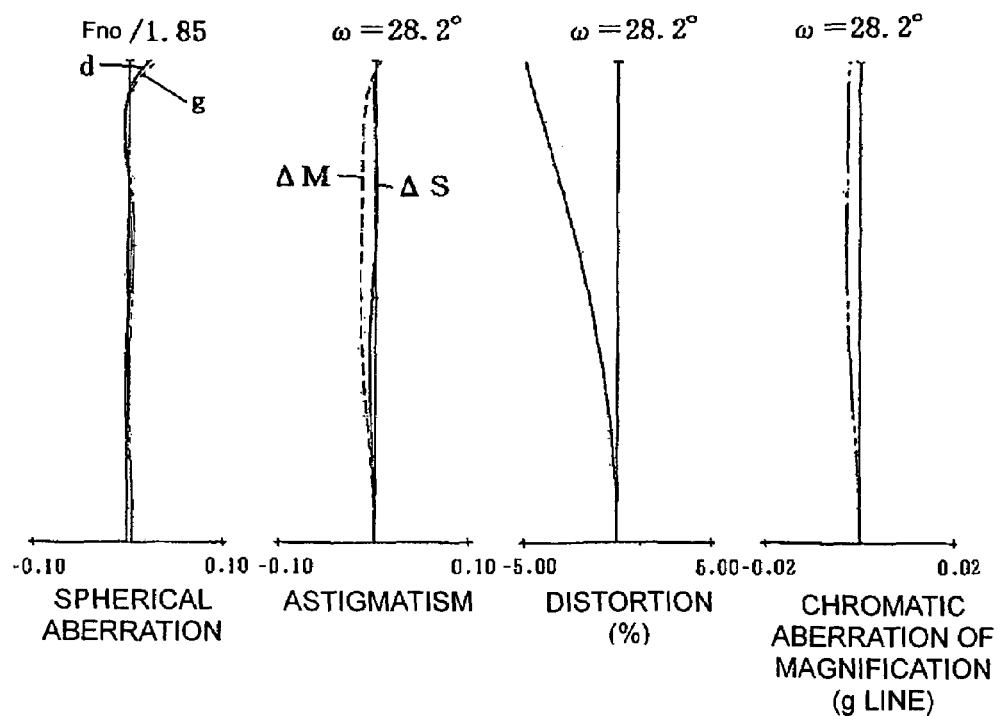
FIG. 18 show various types of aberration of the zoom lens of Numerical Example 5 at the wide angle end.
Figure 19:
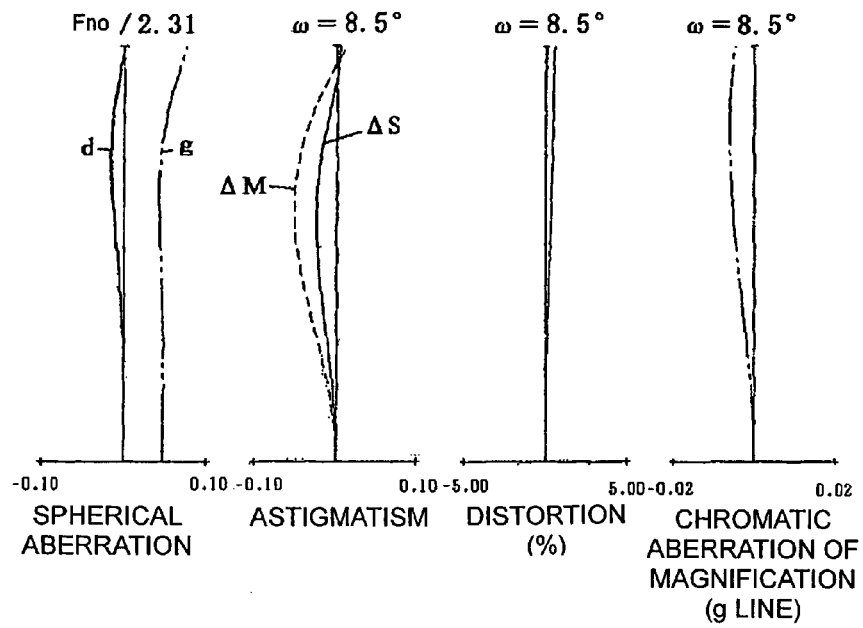
FIG. 19 show various types of aberration of the zoom lens of Numerical Example 5 at an intermediate zoom position.
Figure 20:
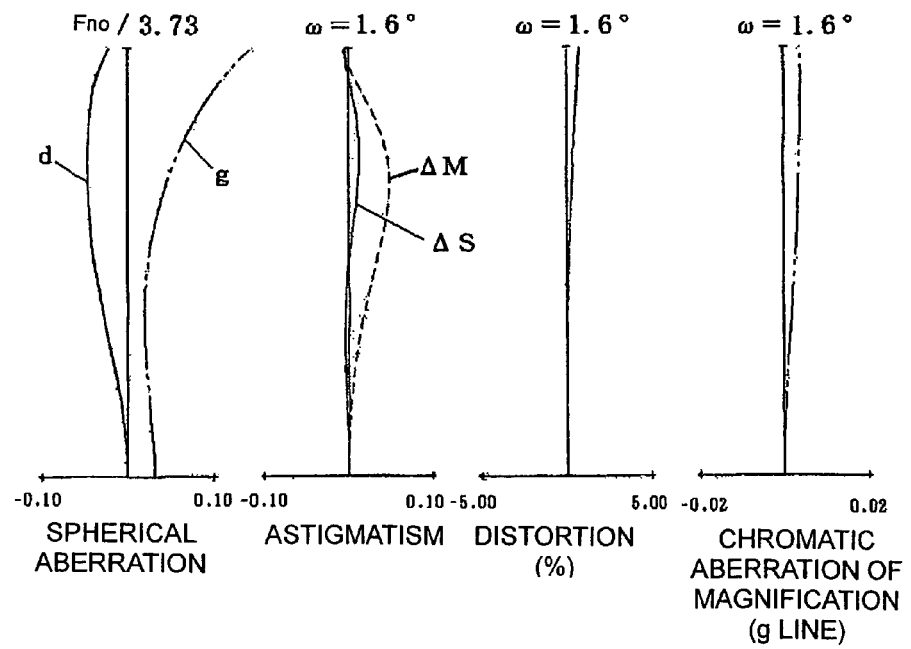
FIG. 20 show various types of aberration of the zoom lens of Numerical Example 5 at a telephoto end.

FIG. 17 shows a section of a zoom lens of Numerical Example 5 of the present embodiment at a wide angle end, and FIGS. 18, 19, and 20 respectively show various types of aberration at the wide angle end, an intermediate zoom position, and a telephoto end in the zoom lens of Numerical Example 5.

Figure 21:
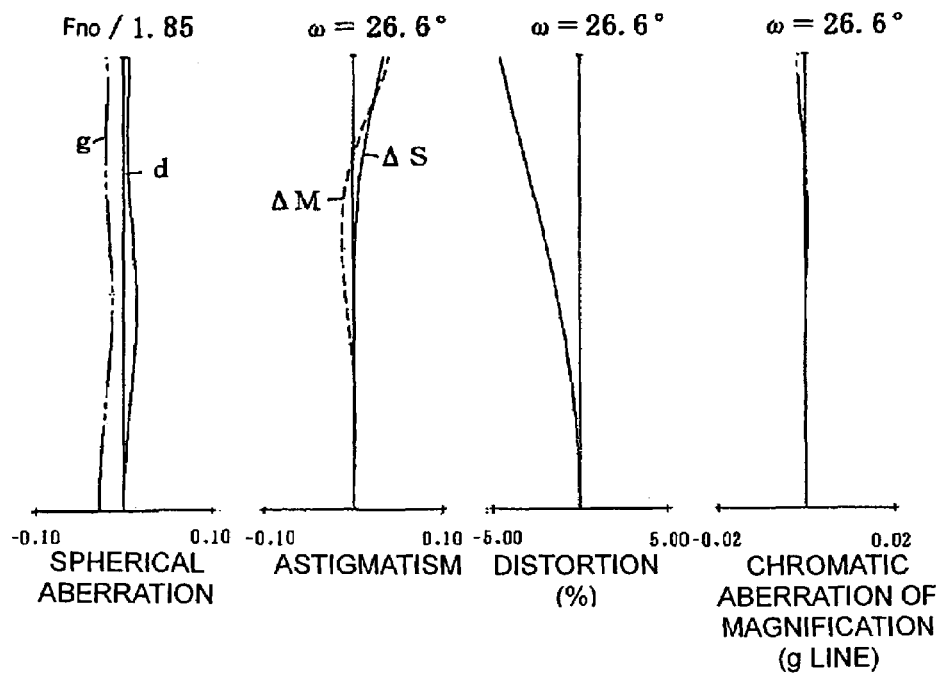
FIG. 21 show various types of aberration of the zoom lens of Numerical Example 6 at a wide angle end.
Figure 22:
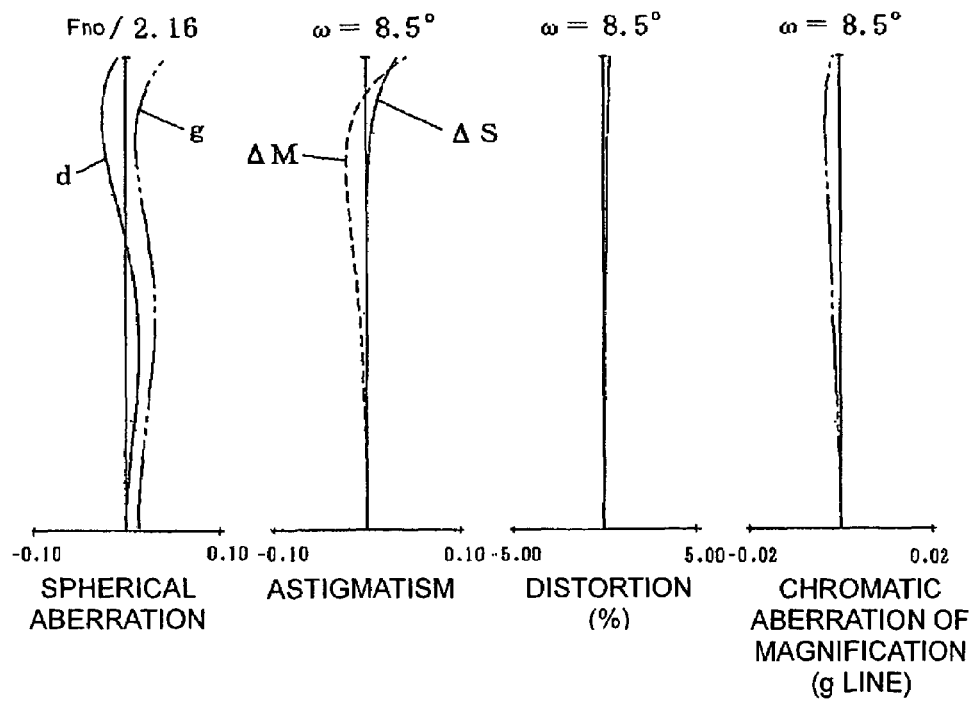
FIG. 22 show various types of aberration of the zoom lens of Numerical Example 6 at an intermediate zoom position.
Figure 23:
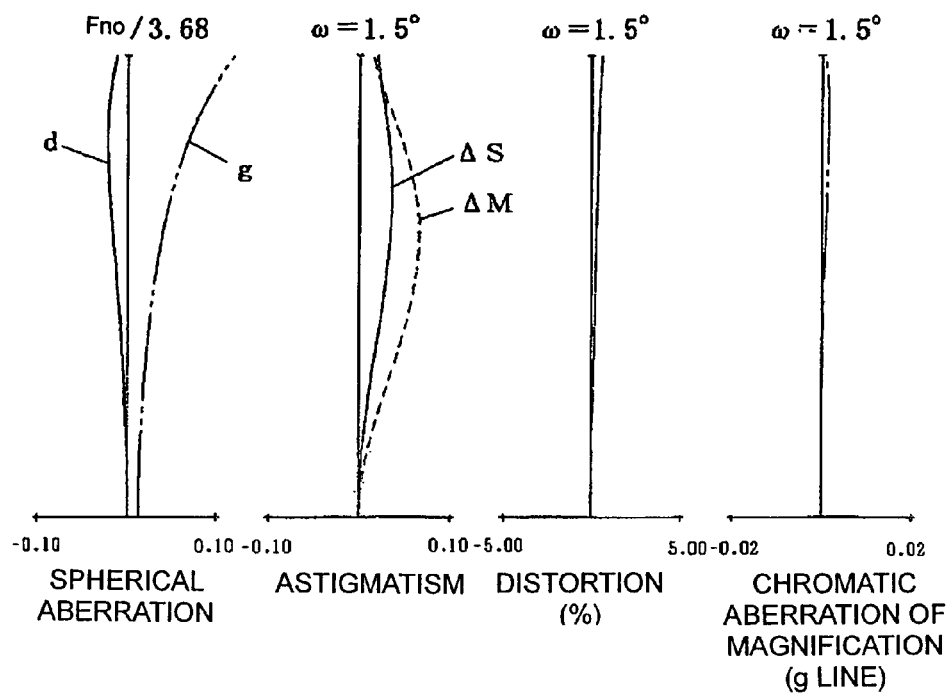
FIG. 23 show various types of aberration of the zoom lens of Numerical Example 6 at a telephoto end.

FIGS. 21, 22, and 23 respectively show various types of aberration at the wide angle end, an intermediate zoom position, and the telephoto end in a zoom lens of Numerical Example 6 of the present embodiment.

Figure 24:
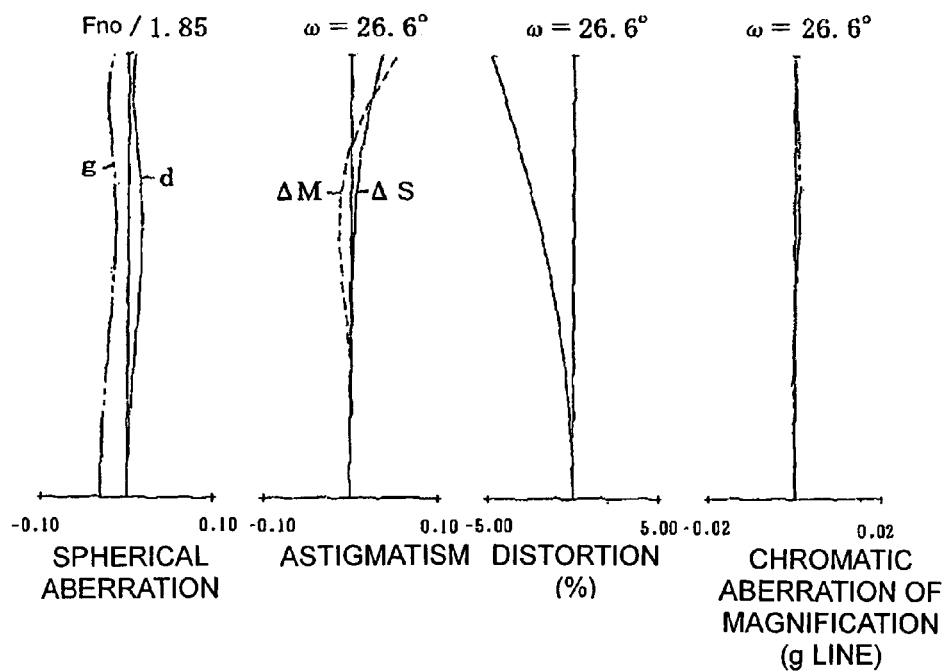
FIG. 24 show various types of aberration of the zoom lens of Numerical Example 7 at a wide angle end.
Figure 25:
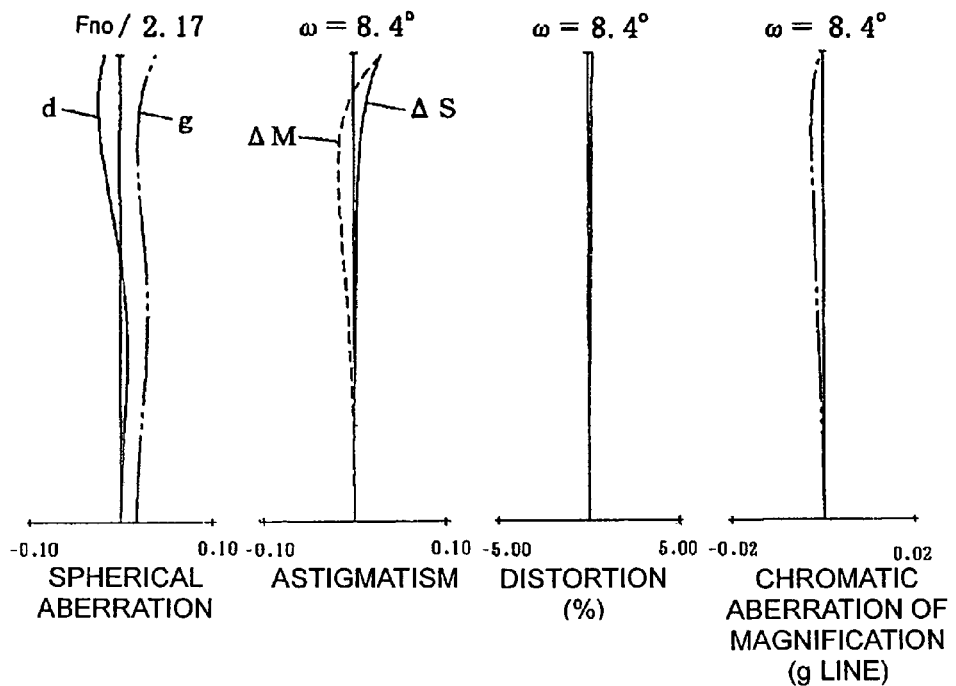
FIG. 25 show various types of aberration of the zoom lens of Numerical Example 7 at an intermediate zoom position.
Figure 26:
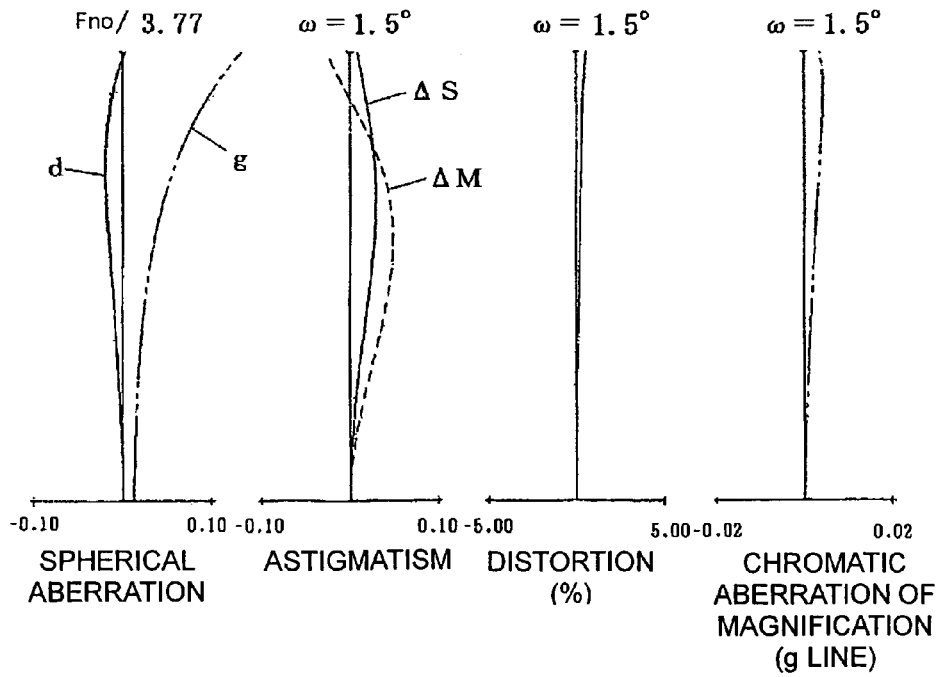
FIG. 26 show various types of aberration of the zoom lens of Numerical Example 7 at a telephoto end.

FIGS. 24, 25, and 26 respectively show various types of aberration at the wide angle end, an intermediate zoom position, and the telephoto end in a zoom lens of Numerical Example 7 of the present embodiment.

The sections of the zoom lenses of Numerical Examples 6 and 7 are omitted since these are generally the same as the section of the zoom lens of Numerical Example 5.

Each zoom lens of the present embodiment is also an image taking lens system used in an image-taking apparatus, and in each lens section, the left side is the object side (front side) and the right side is the image side (rear side). In the lens section, L1 is a first lens unit with a positive refractive power (optical power=inverse of the focal length), L2 is a second lens unit with a negative refractive power, L3 is a third lens unit with a positive refractive power, and L4 is a fourth lens unit with a positive refractive power. SP is an aperture stop, which is positioned further to the object side with respect to the third lens unit L3.

G is an optical block corresponding to an optical filter, faceplate, etc. IP is an image surface, corresponding to an image pickup surface of CCD sensor, CMOS sensor, or other solid-state image pickup element (photoelectric conversion element) in a case of use as an image taking optical system of a video camera or a digital still camera or to a film surface in a case of use as an image taking optical system of a camera for silver halide film.

In the aberration diagrams, d and g indicate the d line and g line, respectively, ΔM and ΔS indicate the meridional image surface and sagittal image surface, respectively, and the chromatic aberration of magnification is shown for the g line.

With the present embodiment, the wide angle end and the telephoto end refer to zoom positions at which the lens units for zooming are positioned at the respective ends of the movable range along the optical axis in terms of mechanism.

As shown by the arrows, with the present embodiment, during zooming from the wide angle end to the telephoto end, the second lens unit L2 is moved towards the image side to perform zooming and the fourth lens unit L4 is moved so as to follow track that is convex towards the object side to correct the variation of the image surface that accompanies zooming.

Also, a rear focus method, wherein the fourth lens unit L4 is moved along the optical axis to perform focusing, is employed. The solid curve 4a and the dotted curve 4b concerning the fourth lens unit L4 are movement tracks for correcting the variation of the image surface that accompanies zooming when the focus is set on an object at infinity and an object at close distance, respectively. By thus making the movement track of the fourth lens unit L4 convex towards the object side, effective use is made of the space between the third lens unit L3 and the fourth lens unit L4 and reduction of the total lens length is achieved effectively.

Also when focusing is to be performed from an object at infinity to an object at close distance at the telephoto end, the fourth lens unit L4 is moved towards the front as indicated by the arrow 4c. Though the first lens unit L1 and the third lens unit L3 are not moved (are fixed) in the optical axis direction for zooming and focusing, these may be moved if necessary for the purpose of aberration corrections.

With each zoom lens of the present embodiment, the first lens unit L1 is configured, in the order from the object side to the image side, a cemented lens, wherein a meniscus-shaped lens 11, having a negative refractive power and having a convex object side surface, is joined to a lens 12 with a positive refractive power, and a meniscus-shaped lens 13, having a positive refractive power and having a convex object side surface.

The second lens unit L2 is configured, in the order from the object side to the image side, a lens 21 (first lens element), with a negative refractive power and with which the image side surface is greater in the absolute value of the refractive power than the object side surface, a lens 22 (second lens element), with a negative refractive power and with which the object side surface has a concave shape, and a lens 23 (third lens element), with a positive refractive power and with which the object side surface is greater in the absolute value of the refractive power than the image side surface. An air exists in the interval between lens 22 and lens 23 along the axis, these lenses are positioned with an interval in between.

By arranging the second lens unit L2 thus, the curvature of field, distortion, and other aberrations that vary during zooming are corrected well.

The third lens unit L3 is configured from a lens 31, with a positive refractive power and with which the object side and image side surfaces have convex shapes, and a meniscus-shaped lens 32, with a positive refractive power and with which the object side surface has a convex shape.

The fourth lens unit L4 is configured from a cemented lens, in which a lens 41, with a positive refractive power and with which the object side and image side surfaces have convex shapes, is joined to a meniscus-shaped lens 42, with a negative refractive power and with which the image side surface has a convex shape.

The aberration variations that occur when focusing is performed by using the fourth lens unit L4 are thereby lessened.

With the present embodiment, by configuring the respective lens units in the manner described above, the lens system is made compact as a whole and, despite being a simple lens arrangement, high optical performance is provided with respect to the entire zooming range and all object distances.

Characteristics of the present embodiment's zoom lens besides the above-described characteristics shall now be described.

When f2 represents the focal length of the second lens unit L2, ft represents the focal length of the entire system at the telephoto end zoom position, and ν23 and N23 represent the Abbe's number and refractive index, respectively, of the material of the lens 23, the following conditions are satisfied:

$$\nu 23 < 20.0 \tag{1}$$

$$N23 > 1.9 \tag{9}$$

$$-0.1 < f2/ft < -0.05 \tag{10}$$

A four-unit zoom lens, having, in order from the object side to the image side, a first lens unit with a positive refractive power, a second lens unit with a negative refractive power, a third lens unit with a positive refractive power, and a fourth lens unit with a positive refractive power, and being of zoom type wherein the second and fourth lens units are moved during zooming, are frequently used in the image-taking apparatuses of video cameras, digital cameras, etc. Compactness and high zoom ratio are demanded of an optical system used in such an image-taking apparatus.

With a four-unit zoom lens of this zoom type, the second lens unit L2 is generally configured from the four lenses of three lenses with a negative refractive power and one lens with a positive refractive power or from a larger number of lenses.

On the other hand, with each zoom lens of the present embodiment, by a glass material of high dispersion that satisfies the conditional expression (1) being used as the material of the lens 23 with the positive refractive power in the second lens unit L2 and by the satisfying of the conditional expressions (9) and (10), the second lens unit L2 is configured as a three-lens arrangement as a whole and yet the chromatic aberrations that occur at the second lens L2 are reduced.

The conditional expression (1) is for performing chromatic aberration correction effectively by means of the single lens 23 with the positive refractive power. When the Abbe's number becomes so large that the upper limit of the conditional expression (1) is exceeded, the achromatic effect of the second lens unit L2 becomes weak and it becomes difficult to achieve both a high zoom ratio and high performance at the same time with a small number of lenses.

The conditional expression (9) is for performing aberration corrections well during zooming by means of the single lens 23 with the positive refractive power. When the refractive index of the material of the lens 23 becomes so small that the conditional expression (9) is not attained, it becomes difficult to correct the variation of the coma aberration that occurs during zooming.

The conditional expression (10) is for achieving the reduction of the total optical length while maintaining good optical performance and defines the negative refractive power of the second lens unit L2. It is not preferable to make the refractive power of the second lens unit L2 become so strong that the upper limit of the conditional expression (10) is exceeded since, though the movement amount of the second lens unit L2 during zooming will be reduced, the Petzval's sum will become large as a whole in the negative direction and it will become difficult to correct the curvature of field. On the other hand, it is not preferable for the lower limit of the conditional expression (10) to be attained since the movement amount of the second lens unit L2 during zooming will then be large and it becomes difficult to make the lens optical system compact as a whole.

More preferably, the numerical values of the conditional expressions (1), (9), and (10) are set as follows:

$$\nu 23 < 19 \tag{1a}$$

$$N23 > 1.91 \tag{9a}$$

$$-0.09 < f2/ft < -0.06 \tag{10a}$$

When D23 represents the interval between the lens 22 and the lens 23, the following conditional expression is satisfied:

$$0.1 < |D23/f2| < 0.4 \quad (11)$$

The conditional expression (11) is for correcting the coma aberration and the curvature of field well at the telephoto end zoom position.

It is not preferable for the lower limit of the conditional expression (11) not to be attained, since the positive curvature of field at the telephoto end zoom position will then be large and it becomes difficult to correct the outwardly directed coma aberration. Oppositely, it is not preferable for the upper limit of the conditional expression (11) to be exceeded since the curvature of field will then be large in the negative direction and it becomes difficult to correct the inwardly directed coma aberration.

More preferably, the range of the conditional expression (11) is set as follows:

$$0.15 < |D23/f2| < 0.3 \quad (11a)$$

When Ra and Rb represent the radii of curvature of the object side and image side surfaces, respectively, of the lens 23, the following conditional expression is satisfied:

$$0.8 < (R23b+R23a)/(R23b-R23a) < 2.0 \quad (4)$$

The conditional expression (4) is for appropriately setting the shape of the lens 23 so as to perform good correction of the various aberrations across the entire zoom range.

It is not preferable for the lower limit of the conditional expression (4) not to be attained since the astigmatism at the zoom position of the wide angle end will then increase in the negative direction. Oppositely, it is not preferable for the upper limit of the conditional expression (4) to be exceeded since the astigmatism at the zoom position of the wide angle end will then increase in the positive direction.

More preferably, the numerical range of the conditional expression (4) is set as follows to enable even better optical performance to be achieved:

$$1.0 < (R23b+R23a)/(R23b-R23a) < 1.7 \quad (4a)$$

When N21 and N22 are the refractive indices of the materials forming the lens 21 and the lens 22, respectively, the following conditional expression is satisfied:

$$1.65 < (N21+N22)/2 \quad (2)$$

The conditional expression (2) is for repressing the Petzval's sum from increasing in the positive direction and the sagittal image surface from becoming excessive and thereby reducing the degradation of the optical performance when the refractive index of the material of the lens 23 is increased.

It is not preferable to make the refractive indices of the materials of the lenses 21 and 22 become so low that the lower limit of conditional expression (2) is not attained, since the Petzval's sum will then increase in the negative direction and the correction of the sagittal curvature of field becomes difficult.

More preferably, the numerical values of the conditional expression (2) are set as follows:

$$1.72 < (N21+N22)/2 \quad (2a)$$

When R2a represents the radius of curvature of the object side surface and R2b represents the radius of curvature of the image side surface of the lens 22, the following conditional expression is satisfied:

$$-0.4 < (R22b+R22a)/(R22b-R22a) < 0.4 \quad (6)$$

It is not preferable for the lower limit of the conditional expression (6) not to be attained since the astigmatism at the zoom position of the wide angle end will then increase in the positive direction. Oppositely, it is not preferable for the upper limit of the conditional expression (6) to be exceeded since the astigmatism at the zoom position of the wide angle end will then increase in the negative direction.

More preferably, the numerical range of the conditional expression (6) is set as follows:

$$-0.3 < (R22b+R22a)/(R22b-R22a) < 0.2 \quad (6b)$$

The numerical data of Numerical Examples 5 to 7 are shown below.

Also, the relationships between the respective conditional expressions described above and the various numerical values of the Numerical Examples are shown in Table 1.

NUMERICAL EXAMPLE 5

| f = 3.73 to 73.85 | Fno = 1.85 to 3.64 | 2ω = 56.4° to 3.1° | |
|---|---|---|---|
| R1 = 39.186 | D1 = 1.20 | N1 = 1.846660 | ν1 = 23.9 |
| R2 = 21.028 | D2 = 4.90 | N2 = 1.603112 | ν2 = 60.6 |
| R3 = −417.918 | D3 = 0.20 | | |
| R4 = 19.953 | D4 = 2.80 | N3 = 1.696797 | ν3 = 55.5 |
| R5 = 58.070 | D5 = Variable | | |
| R6 = 26.992 | D6 = 0.80 | N4 = 1.882997 | ν4 = 40.8 |
| R7 = 6.110 | D7 = 2.10 | | |
| R8 = −12.454 | D8 = 0.70 | N5 = 1.772499 | ν5 = 49.6 |
| R9 = 7.441 | D9 = 0.90 | | |
| R10 = 9.664 | D10 = 1.75 | N6 = 1.922860 | ν6 = 18.9 |
| R11 = 37.556 | D11 = Variable | | |
| R12 = Stop | D12 = 1.50 | | |
| R13 = 7.538 | D13 = 3.80 | N7 = 1.583126 | ν7 = 59.4 |
| R14 = −27.639 | D14 = 0.20 | | |
| R15 = 11.506 | D15 = 0.70 | N8 = 1.846660 | ν8 = 23.9 |
| R16 = 6.628 | D16 = Variable | | |
| R17 = 12.208 | D17 = 3.30 | N9 = 1.517417 | ν9 = 52.4 |
| R18 = −6.388 | D18 = 0.70 | N10 = 1.846660 | ν10 = 23.9 |
| R19 = −11.262 | D19 = Variable | | |
| R20 = ∞ | D20 = 2.62 | N11 = 1.516330 | ν11 = 64.1 |
| R21 = ∞ | | | |

| Variable | Focal Length | | |
|---|---|---|---|
| Distance | 3.73 | 24.00 | 73.85 |
| D5 | 0.60 | 14.87 | 18.90 |
| D11 | 20.30 | 6.03 | 2.00 |
| D16 | 8.00 | 3.26 | 10.49 |
| D19 | 4.90 | 9.64 | 2.41 |

Aspheric Coefficient

R13 k = −8.36549e−1　A' = 5.99648e−5　B' = −5.66319e−6
C' = 8.04577e−7
D' = −4.37113e−8　E' = 7.82311e−10

R14 k = −6.26116e+01　A' = −1.10778e−4　B' = −5.06022e−5　C' = 5.45208e−6
D' = −2.67048e−7　E' = 4.93758e−9

NUMERICAL EXAMPLE 6

| f = 2.90 to 62.60 | Fno = 1.85 to 3.68 | 2ω = 53.1° to 3.1° | |
|---|---|---|---|
| R1 = 34.936 | D1 = 0.99 | N1 = 1.846660 | ν1 = 23.9 |
| R2 = 18.442 | D2 = 3.50 | N2 = 1.603112 | ν2 = 60.6 |
| R3 = −228.460 | D3 = 0.15 | | |
| R4 = 16.847 | D4 = 2.35 | N3 = 1.696797 | ν3 = 55.5 |
| R5 = 44.802 | D5 = Variable | | |
| R6 = 38.218 | D6 = 0.65 | N4 = 1.834000 | ν4 = 37.2 |
| R7 = 4.093 | D7 = 1.57 | | |
| R8 = −9.380 | D8 = 0.60 | N5 = 1.696797 | ν5 = 55.5 |
| R9 = 9.580 | D9 = 0.90 | | |
| R10 = 10.260 | D10 = 1.50 | N6 = 1.922860 | ν6 = 18.9 |
| R11 = 77.484 | D11 = Variable | | |
| R12 = Stop | D12 = 0.80 | | |
| R13 = 7.139 | D13 = 3.50 | N7 = 1.524700 | ν7 = 56.2 |
| R14 = −18.753 | D14 = 0.13 | | |
| R15 = 8.945 | D15 = 0.60 | N8 = 1.846660 | ν8 = 23.9 |
| R16 = 5.811 | D16 = Variable | | |
| R17 = 9.307 | D17 = 2.80 | N9 = 1.516330 | ν9 = 64.1 |
| R18 = −5.612 | D18 = 0.55 | N10 = 1.805181 | ν10 = 25.4 |
| R19 = −10.444 | D19 = 2.00 | | |
| R20 = ∞ | D20 = 2.92 | N11 = 1.516330 | ν11 = 64.2 |
| R21 = ∞ | | | |

| Variable | Focal Length | | |
|---|---|---|---|
| Distance | 2.90 | 18.23 | 62.60 |
| D5 | 0.66 | 13.48 | 17.10 |
| D11 | 18.64 | 5.81 | 2.19 |
| D16 | 8.06 | 4.48 | 10.07 |

Aspheric Coefficient

R13

K = −2.73676  B = 6.42726e−4  C = −2.08804e−5  D = −6.98888e−7
E = 6.82311e−08  F = −2.47029e−09

R14 k = −3.23379  B = 2.48150e−4  C = −3.91968e−5  D = 1.06317e−6
E = 1.98508e−10  F = −1.45553e−9

Numerical Example 7

| f = 2.90 to 62.60 | Fno = 1.85 to 3.77 | 2ω = 53.1° to 3.1° | |
|---|---|---|---|
| R1 = 33.919 | D1 = 0.99 | N1 = 1.846660 | ν1 = 23.9 |
| R2 = 17.942 | D2 = 3.50 | N2 = 1.603112 | ν2 = 60.6 |
| R3 = −231.623 | D3 = 0.15 | | |
| R4 = 16.517 | D4 = 2.35 | N3 = 1.696797 | ν3 = 55.5 |
| R5 = 43.914 | D5 = Variable | | |
| R6 = 15.625 | D6 = 0.65 | N4 = 1.806098 | ν4 = 40.9 |
| R7 = 4.240 | D7 = 1.88 | | |
| R8 = −6.711 | D8 = 0.60 | N5 = 1.693501 | ν5 = 53.2 |
| R9 = 7.324 | D9 = 0.90 | | |
| R10 = 9.525 | D10 = 1.50 | N6 = 1.922860 | ν6 = 18.9 |
| R11 = 45.801 | D11 = Variable | | |
| R12 = Stop | D12 = 0.80 | | |
| R13 = 7.502 | D13 = 3.50 | N7 = 1.583126 | ν7 = 59.4 |
| R14 = −21.532 | D14 = 0.13 | | |
| R15 = 8.972 | D15 = 0.60 | N8 = 1.846660 | ν8 = 23.9 |
| R16 = 5.927 | D16 = Variable | | |
| R17 = 9.190 | D17 = 2.80 | N9 = 1.516330 | ν9 = 64.1 |
| R18 = −5.453 | D18 = 0.55 | N10 = 1.805181 | ν10 = 25.4 |
| R19 = −10.112 | D19 = 2.00 | | |
| R20 = ∞ | D20 = 2.92 | N11 = 1.516330 | ν11 = 64.2 |

-continued

| R21 = ∞ | D21 = 0.00 | | |
|---|---|---|---|
| R22 = ∞ | | | |

| Variable | Focal Length | | |
|---|---|---|---|
| Distance | 2.90 | 18.59 | 62.60 |
| D5 | 0.66 | 12.88 | 16.32 |
| D11 | 17.33 | 5.12 | 1.67 |
| D15 | 8.04 | 4.06 | 9.53 |

Aspheric Coefficient

R13 k = −2.92179  B = 6.52549e−4  C = −1.76137e−5  D = −4.33757e−7
E = 6.90403e−8  F = −2.47029e−9

R14 k = −3.04183  B = 3.15051e−4  C = −3.07169e−5  D = 1.08332e−6
E = 1.98508e−10  F = −1.45553e−9

TABLE 2

| | | Numerical Example | | |
|---|---|---|---|---|
| Conditional Expression | | 6 | 7 | 8 |
| (1) | ν23 | 18.9 | 18.9 | 18.9 |
| (9) | N23 | 1.92286 | 1.92286 | 1.92286 |
| (10) | f2/f2t | −0.0641 | −0.0656 | −0.0607 |
| (11) | \|D23/f2\| | 1.693 | 0.219 | 0.237 |
| (4) | (R23b + R23a)/(R23b − R23a) | 0.190 | 1.305 | 1.525 |
| (2) | (N21 + N22)/2 | 1.828 | 1.765 | 1.750 |
| (6) | (R22b + R22a)/(R22b − R22a) | −0.252 | 0.011 | 0.044 |

Embodiment 3

Embodiments of a video camera and a digital still camera using the zoom lenses of the present invention as the image taking optical systems shall now be described using FIGS. 27 and 28.

Figure 27:
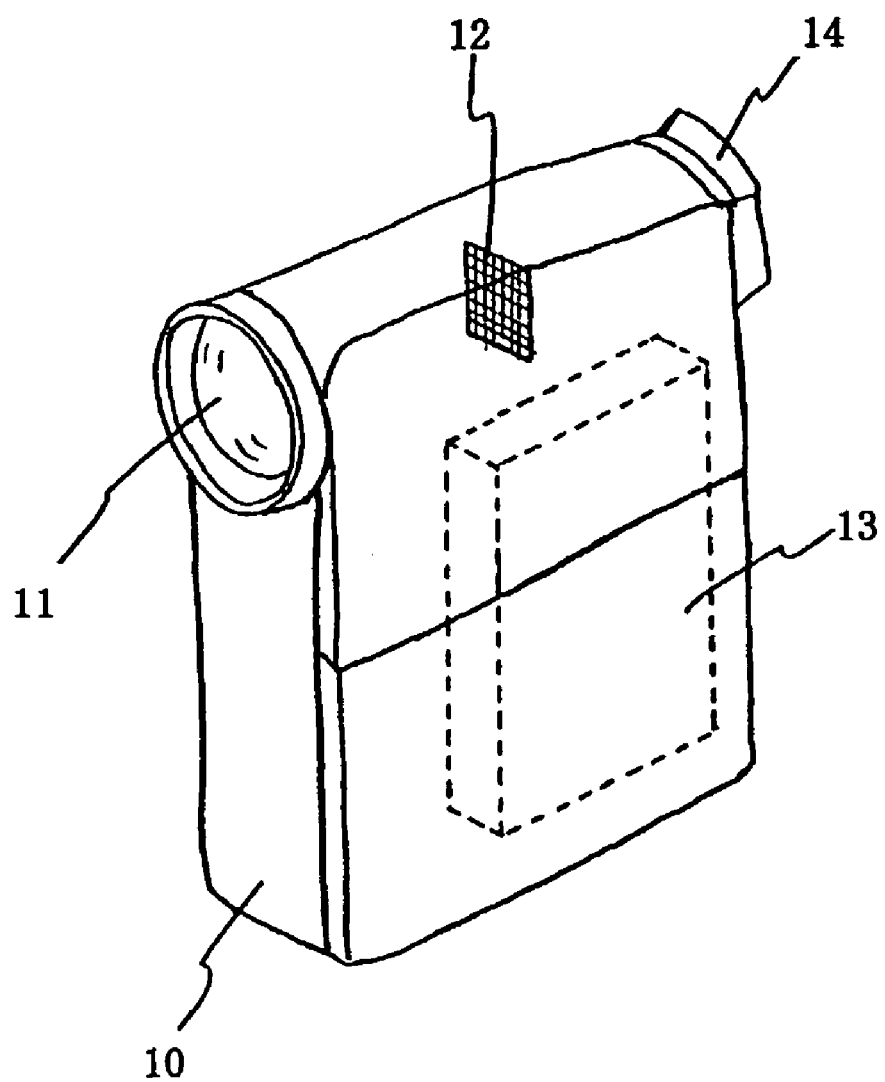
FIG. 27 is a schematic view of a principal parts of a video camera.

In FIG. 27, Reference Numeral 10 denotes a main video camera body, Reference Numeral 11 denotes an image taking optical system, configured from the zoom lens according to the present invention, Reference Numeral 12 denotes a CCD sensor, CMOS sensor, or other solid-state image pickup element (photoelectric conversion element) that receives the object image formed by the image taking optical system 11, Reference Numeral 13 denotes memory for storing data corresponding to the object image that has been photoelectrically converted by the image pickup device 12, and Reference Numeral 14 denotes a viewfinder for observing the object image that is displayed on an unillustrated display element. The abovementioned display element is configured from a liquid crystal panel, etc., and the object image that is formed on the image pickup element 12 is displayed thereon.

An example of the digital still camera shall now be described using FIG. 28.

Figure 28:
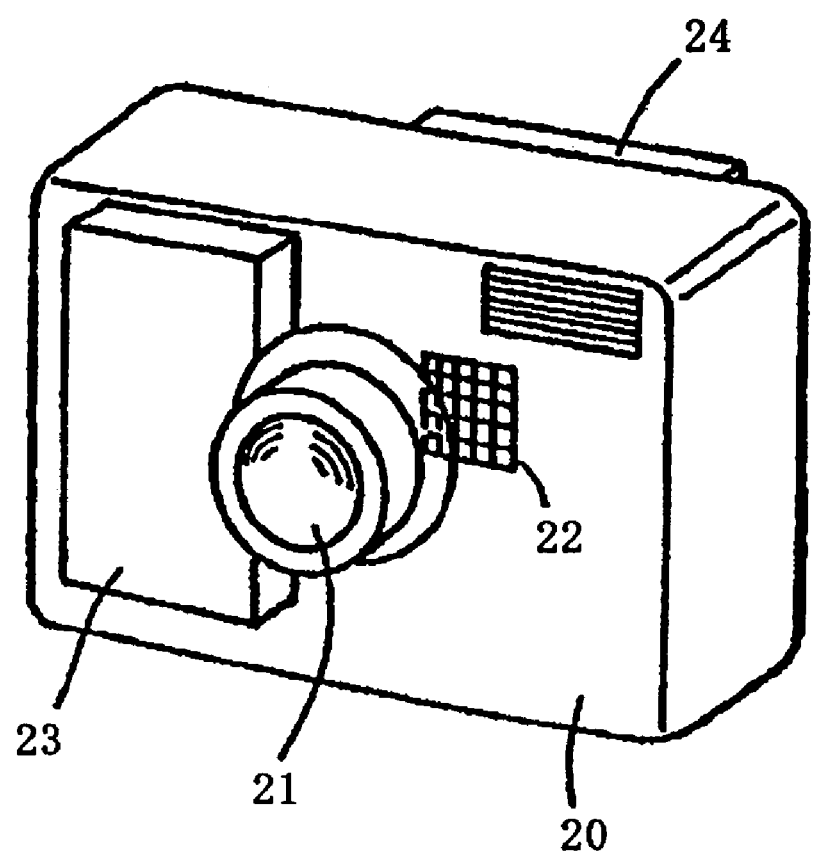
FIG. 28 is a schematic view of a principal parts of a digital still camera.

In FIG. 28, Reference Numeral 20 denotes a main camera body, Reference Numeral 21 denotes an image taking optical system, configured from an above-described zoom lens of any of Embodiments 1 to 3, Reference Numeral 22 denotes a CCD sensor, CMOS sensor, or other solid-state image pickup element (photoelectric conversion element), which is built into the main camera body 20 and receives the object image formed by the image taking optical system 21, Reference Numeral 23 denotes memory for storing data corresponding to the object image that has been photoelectrically converted by the image pickup element 22, and Reference Numeral 24 denotes a viewfinder, which is configured from a liquid crystal display panel, etc., and is for observing the object image that is formed on the image pickup element 22.

By thus applying the zoom lens of the present invention to an image-taking apparatus, such as a video, camera, digital still camera, etc., a compact image-taking apparatus of high optical performance can be realized.

What is claimed is:

1. A zoom lens system comprising, in order from an object side to an image side:
    a first lens unit with a positive optical power;
    a second lens unit with a negative optical power, the second lens unit consisting of, in order from the object side to the image side, a first lens element with a negative optical power, a second lens element with a negative optical power, and a third lens element with a positive optical power, the first lens element having an image side surface whose absolute value of the optical power is greater than that of an object side surface thereof, the second lens element having an object side surface with a concave shape, the third lens element being disposed across an interval from the second lens element and having an object side surface with a convex shape; and
    at least one lens unit;
    wherein at least one of the first lens unit and the second lens unit is moved during zooming, and the following conditions are satisfied:

$\upsilon < 20.0 \ 1.65 < (N21+N22)/2$ where $\upsilon$ represents an Abbe's number of a material forming the third lens element, and N21 and N22 represent refractive indices of materials forming the first lens element and the second lens element, respectively.

2. The zoom lens system according to claim 1, wherein the following condition is satisfied:

$1.8 < |f23/f2| < 3.7$ where f23 and f2 represent focal lengths of the third lens element and the second lens unit, respectively.

3. The zoom lens system according to claim 1, wherein the following condition is satisfied:

$0.8 < (R23b+R23a)/(R23b-R23a) < 2.0$ where R23a and R23b represent radii of curvature of an object side surface and an image side surface, respectively, of the third lens element.

4. The zoom lens system according to claim 1, wherein the following condition is satisfied:

$0.25 < |f2|/\sqrt{(fw \times ft)} < 0.6$ where fw and ft represent focal lengths of the entire lens system at a wide angle end and a telephoto end, respectively, and f2 represents a focal length of the second lens unit.

5. The zoom lens system according to claim 1, wherein the following condition is satisfied:

$-0.4 < (R22b+R22a)/(R22b-R22a) < 0.4$ where R22a and R22b represent radii of curvature of an object side surface and an image side surface, respectively, of the second lens element.

6. The zoom lens system according to claim 1, wherein the at least one lens unit includes a third lens unit with a positive optical power.

7. The zoom lens system according to claim 6, wherein during zooming from a wide angle end to a telephoto end, the second lens unit is moved towards the image side and the third lens unit is moved along a track that is convex towards the object side.

8. The zoom lens system according to claim 7, wherein the following condition is satisfied:

$0.1 < |M3/M2| < 0.3$ where M2 represents a movement amount of the second lens unit that is required for zooming from the wide angle end to the telephoto end, and M3 represents a movement amount of the third lens unit to a most object side position during zooming from the wide angle end to the telephoto end.

9. The zoom lens system according to claim 1, wherein the at least one lens unit includes a third lens unit with a positive optical power and a fourth lens unit having a positive optical power and being disposed further to the image side with respect to the third lens unit.

10. The zoom lens system according to claim 1, wherein during zooming from a wide angle end to a telephoto end, the second lens unit is moved towards the image side and the first lens unit is moved so as to be positioned further to the object side at the wide angle end than at the telephoto end.

11. The zoom lens system according to claim 10, wherein the following condition is satisfied:

$0.03 < |M1/M2| < 0.4$ where M1 and M2 represent movement amounts of the first lens unit and the second lens unit, respectively, during zooming from the wide angle end to the telephoto end.

12. The zoom lens system according to claim 1, wherein the number of lens elements that the zoom lens system has is eleven or less.

13. The zoom lens system according to claim 1, wherein the zoom lens system forms an image on a photoelectric conversion element.

14. An image-taking apparatus comprising: the zoom lens system according to claim 1, and a photoelectric conversion element, receiving an image formed by the zoom lens system.

* * * * *